US011082728B2

(12) United States Patent
Yim et al.

(10) Patent No.: US 11,082,728 B2
(45) Date of Patent: Aug. 3, 2021

(54) METHOD AND APPARATUS FOR PROVIDING BROADCAST SERVICE BASED ON SCALABLE CODEC

(71) Applicant: Electronics and Telecommunications Research Institute, Daejeon (KR)

(72) Inventors: Hyun-Jeong Yim, Sejong-si (KR); Jae-Young Lee, Daejeon (KR); Sung-Ik Park, Daejeon (KR); Heung-Mook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/557,528

(22) Filed: Aug. 30, 2019

(65) Prior Publication Data

US 2020/0077126 A1   Mar. 5, 2020

(30) Foreign Application Priority Data

| Aug. 31, 2018 | (KR) | 10-2018-0103650 |
| Dec. 7, 2018 | (KR) | 10-2018-0157582 |
| Dec. 10, 2018 | (KR) | 10-2018-0158218 |
| Dec. 13, 2018 | (KR) | 10-2018-0161326 |
| Jan. 8, 2019 | (KR) | 10-2019-0002284 |
| Aug. 28, 2019 | (KR) | 10-2019-0105825 |

(51) Int. Cl.
| H04N 21/2362 | (2011.01) |
| H04L 12/24 | (2006.01) |
| H04N 21/434 | (2011.01) |
| H04N 21/2665 | (2011.01) |

(52) U.S. Cl.
CPC ........ *H04N 21/2362* (2013.01); *H04L 41/50* (2013.01); *H04N 21/2665* (2013.01); *H04N 21/4345* (2013.01)

(58) Field of Classification Search
None
See application file for complete search history.

(56) References Cited

U.S. PATENT DOCUMENTS

| 10,356,453 B2 | 7/2019 | Hwang et al. |
| 2001/0022000 A1* | 9/2001 | Horn .................. H04N 21/2662 725/95 |
| 2014/0002598 A1 | 1/2014 | Kim et al. |

(Continued)

FOREIGN PATENT DOCUMENTS

| KR | 1020140002471 A | 1/2014 |
| KR | 1020160107211 A | 9/2016 |

(Continued)

*Primary Examiner* — Omar S Parra
(74) *Attorney, Agent, or Firm* — William Park & Associates Ltd.

(57) ABSTRACT

Disclosed herein are a method and apparatus for providing and using a broadcast service. Multiple layers of contents may be provided over a broadcast network and a communication network. A terminal may acquire the multiple layers over the broadcast network and the communication network. When a specified layer cannot be acquired over the broadcast network, the terminal may acquire the specified layer over the communication network, using service-layer signaling information provided over the broadcast network. The service-layer signaling information may include information used to acquire the specified layer over the communication network.

17 Claims, 18 Drawing Sheets

(56) References Cited

U.S. PATENT DOCUMENTS

| | | | |
|---|---|---|---|
| 2016/0191929 A1* | 6/2016 | Hwang | ............ H04N 21/23605 |
| | | | 725/110 |
| 2017/0048013 A1 | 2/2017 | Kwak et al. | |
| 2017/0063960 A1 | 3/2017 | Stockhammer et al. | |
| 2017/0195742 A1 | 7/2017 | Oh et al. | |
| 2018/0234741 A1 | 8/2018 | Kim et al. | |
| 2019/0058922 A1 | 2/2019 | Kwak et al. | |

FOREIGN PATENT DOCUMENTS

| | | | |
|---|---|---|---|
| KR | 1020170101863 A | 9/2017 | |
| KR | 101960317 B1 | 3/2019 | |

* cited by examiner

| SERVICE 5 | FIXED 8K UHD | (ENHANCEMENT LAYER 2) |
|---|---|---|
| SERVICE 4 | FIXED 4K UHD | (ENHANCEMENT LAYER 1) |
| SERVICE 3 | MOBILE HD | (BASE LAYER 1) |
| SERVICE 2 | DIGITAL RADIO SERVICE | |
| SERVICE 1 | EMERGENCY ALERT SERVICE | |

FIG. 1

```
UserServiceDescription
@servicdId (0xXXXX)
Channel
    @serviceIcon(url)
MPUComponent
    @mmtPackageId(XXXX)
BroadbandComponent
    @fullMPDUri
<!-- ComponentInfo Example Code -->
<!-- Audio component/MMT -->
<ComponentInfo componentType="0" componentRole="0" componentId="
Audio_asset" componentName="Audio_component"/>
<!-- Video component/MMT -->
<ComponentInfo componentType="1" componentRole="1" componentId="
V_BL_asset" componentName="SHVC_BL_component"/>
<!-- Video component/BroadbandComponent -->
<ComponentInfo componentType="1" componentRole="2" componentId="
Rep_v100" componentName="SHVC_EL_component"/>
```

FIG. 6

```
UserServiceDescription
@servicdId (0xXXXX)
Channel
    @serviceIcon(url)
<MPUComponent>
    @mmtPackageId(XXXX)
<!-- Audio component/MMT -->
<ComponentInfo componentType="0" componentRole="0" componentId="
Audio_asset" componentName="Audio_component"/>
<!-- Video component/MMT -->
<ComponentInfo componentType="1" componentRole="1" componentId="
V_BL_asset" componentName="SHVC_BL_component"/>
</MPUComponent>

<BroadbandComponent>
    @fullMPDUri
<!-- Video component/BroadbandComponent -->
<ComponentInfo componentType="1" componentRole="2" componentId="
Rep_v100" componentName="SHVC_EL_component"/>
</BroadbandComponent>
```

FIG. 7

```
MP_Table {
    asset_id = MMT_BL
    general_location_info = 0x0010 //packet_id
    asset_id = DASH_EL
    general_location_info = AS_URL
    dependancy_descriptor {
      1
        MMT_BL
      }
}
```

FIG. 11

```
MMT_package_id(MMTPackage)
  Asset_id(V_BL_asset)
    asset_type(hev1)
    location count(2)
    for (I =0; I < 2) {
       packet_id(100)
       URL(video_100_bb/Seg#1)

}

Asset_id(V_EL_asset)
    asset_type(1he1)
    location count(2)
    for (I =0; I < 2) {
       packet_id(103)
       URL(video_103_bb/Seg#1)
    }
    dependency_descriptor {
      V_BL_asset
      }
```

FIG. 12

| USBD/USD | MP TABLE | MPD |
|---|---|---|
| UserServiceDescription<br>@serviceId (0x0001)<br>MPUComponent<br>@mmtPackageId(MMTPackage)<br>BroadbandComponent<br>  @fullMPDUri<br>ComponentInfo<br>  @componentType(video)<br>  @componentRole(0)<br>  @componentId(V_BL_asset)<br>ComponentInfo<br>  @componentType(Audio)<br>  @componentRole(0)<br>  @componentId(A_asset)<br>ComponentInfo<br>  @componentType(video)<br>  @componentRole(0)<br>  @componentId(V_EL_asset) | MMT_package_id(MMTPackage)<br>Asset_id(V_BL_asset)<br>  asset_type(hev1)<br>  packet_id(100)<br>  asset_group_descriptor {<br>    0x00; 0x00<br>  }<br>Asset_id(Audio_asset)<br>  asset_type(mhm1)<br>  packet_id(101)<br>  asset_group_descriptor {<br>    0x01; 0x00<br>  }<br>Asset_id(V_EL_asset)<br>  asset_type(1he1)<br>  packet_id(103)<br>  dependency_descriptor {<br>    V_BL_asset<br>  }<br>  asset_group_descriptor {<br>    0x02; 0x00<br>  }<br>Asset_id(V_BL_DASH)<br>  asset_type(hev1)<br>  representation_id(v100)<br>  asset_group_descriptor {<br>    0x00; 0x01<br>  }<br>Asset_id(Audio_DASH)<br>  asset_type(mhm1)<br>  representation_id(a101)<br>  asset_group_descriptor {<br>    0x01; 0x01<br>  }<br>Asset_id(V_EL_DASH)<br>  asset_type(1he1)<br>  representation_id(v103)<br>  dependency_descriptor {<br>    V_BL_asset<br>  }<br>  asset_group_descriptor {<br>    0x02; 0x01<br>  } | Period<br>AdaptationSet<br>Representation (a101)<br>  Segment URL (audio_101_bb/Seg#1)<br>AdaptationSet<br>Representation (v100)<br>  Segment URL (video_100_bb/Seg#1)<br>Representation (v103)<br>  dependencyId(v100)<br>  Segment URL (video_103_bb/Seg#1) |

FIG. 14

```
Dependency_descriptor() {
    descriptor_tag
    descriptor_length
    num_dependencies
    for ( i = 0 ; i < N1 ; i++ ) {
        asset_id() or Representation_Id()
    }
}
```

SERVICE-LAYER SIGNALING

USBD/USD
UserServiceDescription
@serviceId (0x1001)
MPUComponent
@mmtPackageId(MMTPackage)
BroadbandComponent
@fullMPDUri
BroadbandComponentInfo
@RepId(v100)
@ComplementaryAssetID(V_EL_asset)
@simulcastAssetId(V_BL_asset)
BroadbandComponentInfo
@RepId(v103)
@dependentAssetID(V_BL_asset)
@simulcastAssetId(V_EL_asset)
ComponentInfo
@componentType(video)
@componentRole(3)
@componentId(V_BL_asset)
ComponentInfo
@componentType(Audio)
@componentRole(0)
@componentId(A_asset)
ComponentInfo
@componentType(Audio)
@componentRole(4)
@componentId(V_EL_asset)

MP TABLE
MMT_package_id(MMTPackage)

Asset_id(V_BL_asset)
asset_type(hev1)
packet_id(100)

Asset_id(Audio_asset)
asset_type(mhm1)
packet_id(101)

Asset_id(V_EL_asset)
asset_type(lhe1)
packet_id(103)
dependency_descriptor {
  V_BL_asset
}

MPD
Period
  AdaptationSet
    Representation (a101)
      Segment URL (audio_101_bb/Seg#1)
  AdaptationSet
    Representation (v100)
      Segment URL (video_100_bb/Seg#1)
    Representation (v103)
      dependencyId(v100)
      Segment URL (video_103_bb/Seg#1)

METHOD AND APPARATUS FOR PROVIDING BROADCAST SERVICE BASED ON SCALABLE CODEC

CROSS REFERENCE TO RELATED APPLICATIONS

This application claims the benefit of Korean Patent Application Nos. 10-2018-0103650, filed Aug. 31, 2018, 10-2018-0157582, filed Dec. 7, 2018, 10-2018-0158218, filed Dec. 10, 2018, 10-2018-0161326, filed Dec. 13, 2018, 10-2019-0002284, filed Jan. 8, 2019, and 10-2019-0105825, filed Aug. 28, 2019, which are hereby incorporated by reference in their entireties into this application.

BACKGROUND OF THE INVENTION

1. Technical Field

The following embodiments relate generally to a method and apparatus for providing a broadcast service, and more particularly, to a method and apparatus for providing a broadcast service based on a scalable codec.

2. Description of the Related Art

With the development of recent transmission technology, broadcasting system technology for providing broadcast services of at least two different quality levels, such as 8 K Ultra-High-Definition (UHD), 4K UHD, mobile High Definition (HD), digital radio, an emergency alert service, and an application (App) service, has been developed.

Even if the user of a broadcast service watches a specific channel through his or her receiver when such a broadcasting system is provided, the results of the broadcast service finally rendered on the receiver may vary depending on the reception conditions of the service from the standpoint of the user. Therefore, it is possible to provide a user-centered broadcast service through the broadcasting system.

In order to provide such a broadcast service, it is important to profitably configure a layered service for media contents and transmit the layered service in conformity with reception conditions or the like.

A broadcast service according to this concept may also be utilized even when the same broadcast contents are transmitted. The same broadcast contents may be produced as audio/video (A/V) having a plurality of quality levels based on a scalable codec. Also, since audio/video (A/V) having the plurality of quality levels is transmitted, a broadcast service meeting a required Quality of Service (QoS) and Quality of Experience (QoE) may be provided for various broadcast environments and terminals.

SUMMARY OF THE INVENTION

An embodiment is intended to provide a method and apparatus for providing a broadcast service based on a scalable codec in a hybrid broadcast environment in which a broadcast network and a communication network are used.

In accordance with an aspect, there is provided a method for providing a broadcast service, including generating first information about contents; and outputting the first information over a first network, wherein the first information includes a first layer, among multiple layers of the contents, the first information further includes service information, the service information is information used by a terminal to acquire second information about the contents over a second network, and wherein the second information includes a second layer, among the multiple layers.

The first network may be a broadcast network

The second network may be a communication network.

The multiple layers may include a base layer and an enhancement layer for a scalable codec.

The first information may include all of the multiple layers of the contents.

The second information may include a part of the multiple layers.

The first information may include a base layer and an enhancement layer of the contents.

The second information may include the enhancement layer.

The service information may include a description of a relationship between components of the contents respectively delivered over the first network and the second network.

The service information may include information describing the contents in a protocol used to transmit the second information over the second network.

The service information may include information describing a dependency between a layer of the first information and a layer of the second information.

The service information may include an identifier of a layer of the second information corresponding to a layer of the first information.

The service information may include an identifier of a layer of the second information that depends on a layer of the first information.

In accordance with another aspect, there is provided a broadcast server, including a processing unit for generating first information about contents; and a communication unit for outputting the first information over a first network, wherein the first information includes a first layer, among multiple layers of the contents, the first information further includes service information, the service information is information used by a terminal to acquire second information about the contents over a second network, and the second information includes a second layer, among the multiple layers.

In accordance with a further aspect, there is provided a method for receiving a broadcast service, the method being performed by a terminal, including receiving first information about contents over a first network; and receiving second information about the contents over a second network using service information, wherein the first information includes a first layer, among multiple layers of the contents, the first information further includes the service information, the service information is information used to acquire the second information about the contents over the second network, and the second information includes a second layer, among the multiple layers.

The method may further include outputting the contents using the first information and the second information.

The second information may be received for a handoff of the terminal.

The first network may be a broadcast network.

The second network may be a communication network.

The multiple layers may include a base layer and an enhancement layer for a scalable codec.

The service information may include a description of a relationship between components of the contents respectively delivered over the first network and the second network.

The service information may include information describing the contents in a protocol used to transmit the second information over the second network.

The service information may include information describing a dependency between a layer of the first information and a layer of the second information.

The service information may include an identifier of a layer of the second information corresponding to a layer of the first information.

BRIEF DESCRIPTION OF THE DRAWINGS

FIG. 1 illustrates the configuration of a broadcast service using a scalable codec according to an example;

FIG. 6 illustrates a method using ComponentRole information so as to provide a scalable codec-based service according to an example;

FIG. 7 illustrates the configuration of service-layer signaling information based on a scalable codec according to an example;

FIG. 11 illustrates an MP table depending on the change of an MMT standard or the limitation of the application range of the MMT standard according to an example;

FIG. 12 illustrates the setting of an MMT package and an asset ID depending on the change of an MMT standard or the limitation of the application range of the MMT standard according to an example;

FIG. 14 illustrates service-layer signaling information according to an example;

FIG. 17 illustrates the modified syntax of a dependency descriptor for layered media according to an example; and FIG. 18 illustrates service-layer signaling according to an example.

DESCRIPTION OF THE PREFERRED EMBODIMENTS

Figure 2:
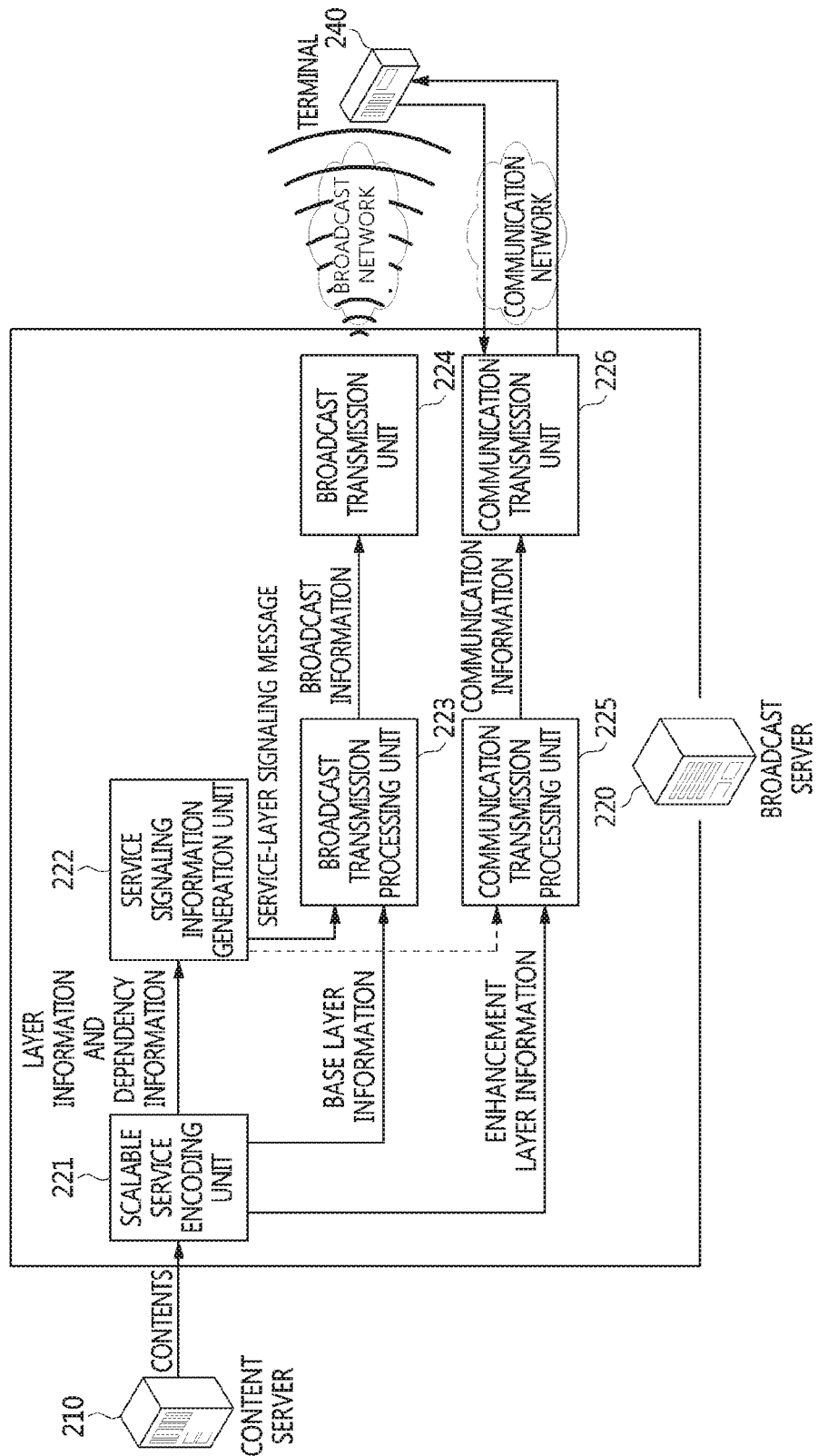
FIG. 2 illustrates the structure of a hybrid broadcasting system according to an embodiment.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

FIG. 1 illustrates the configuration of a broadcast service using a scalable codec according to an example.

In the provision of the broadcast service based on a scalable codec, there may be multiple media transmission and/or reception scenarios depending on a user's broadcast service viewing environment, the user's desired broadcast service format, and the user's desired broadcast service quality. For example, the broadcast service viewing environment may include transport networks and terminals that are available.

For example, the scalable codec may be High-Efficiency Video Coding (HEVC) Scalable Extension (SHVC) based on HEVC.

Therefore, in an environment in which a broadcast network and a communication network are operated in conjunction with each other, a specific type of service multiplexing is required in order to provide a broadcast service which supports a plurality of different quality levels for a single piece of media data.

In FIG. 1, the configuration of multiple broadcast services provided by a broadcasting system is illustrated, and an example in which service 3, service 4, and service 5 in the broadcasting system can be provided as broadcast services of HD, 4K UHD, and 8K UHD using the scalable codec is depicted.

A broadcast service conforming to a specified specification, such as Advanced Television Systems Committee (ATSC) 3.0, may provide a scalable codec service.

The scalable codec may have two layers of media data. The two layers may be a base layer and an enhancement layer. The enhancement layer may have multiple layers. For example, multiple enhancement layers may be a first enhancement layer to an n-th enhancement layer.

Hereinafter, the terms "contents", "media", and "media contents" may be used to have the same meaning, and may be used interchangeably with each other.

Hereinafter, the term "layer" may be understood to be "information indicating a layer", "data indicating a layer", or "data about a layer". In embodiments, the term "layer" may be replaced with "information indicating a layer", "data indicating a layer", "data about a layer" or "layer video" Alternatively, the term "layer" may be understood to be "information for generating a layer" or "information for reconstructing a layer". In embodiments, the term "layer" may be replaced with "information for generating a layer" or "information for reconstructing a layer".

Hereinafter, the terms "broadcast network", "broadcast", "multicast", "multicast network", "unidirectional", and "unidirectional network" may be used to have the same meaning, and may be used interchangeably with each other.

Hereinafter, the terms "communication network", "communication", "broadband", "broadband network", "unicast", "unicast network", "bidirectional", and "bidirectional network" may be used to have the same meaning, and may be used interchangeably with each other.

Hereinafter, the term "base layer" may be abbreviated as "BL". The term "enhancement layer" may be abbreviated as "EL".

Hereinafter, the terms "media component" and "component" may be used to have the same meaning, and may be used interchangeably with each other. Also, the term "component" may be understood to indicate "layer", and may also be understood to include "layer".

A scalable codec may provide media data having a specified quality using one or more layers of the media data. When there is one layer in media data, the layer may be a base layer. When there are multiple layers in media data, the layers may include a base layer and one or more enhancement layers.

The base layer may be the layer that is fundamentally used to provide media data. In other words, the base layer may include information for providing media data at a basic quality (or at the lowest quality).

The greater the number of layers used in the scalable codec, the higher the quality of media data that can be provided. The enhancement layer may be a layer that is added to and used with the base layer so as to provide higher-quality media data. In other words, the enhancement layer may include information required in order to provide media data at a higher quality, and the information of the enhancement layer may be added to the information of the base layer and used therewith.

As the number of the enhancement layer is higher, the corresponding enhancement layer may be used to provide higher-quality media data. In other words, among a total of m enhancement layers, first to n enhancement layers may be used to provide media data together with the base layer. Here, n may be an integer that is equal to or greater than 1 and is less than or equal to m. The larger the value of n, the higher the quality of media data that can be provided.

When one or more layers are transmitted to a terminal, the following various methods may be used depending on the transmission configuration method.

1) deliver a base layer and an enhancement layer (as broadcast signals) over a broadcast network.

2) deliver a base layer (as a broadcast signal) over the broadcast network, and deliver an enhancement layer (as a communication signal) over the communication network.

3) deliver a base layer and an enhancement layer over the communication network 4) deliver a base layer and an enhancement layer over the broadcast network and deliver an enhancement layer over the communication network in the case where a specified condition is satisfied. Here, the case where the specific condition is satisfied may be the case where a broadcast signal is weak.

5) deliver a base layer and an enhancement layer over the broadcast network, and deliver a base layer and an enhancement layer over the communication network so as to perform a specified operation. Here, the specified operation may be that of a handoff service that is required in order to prepare for a region to which a broadcast signal cannot be delivered or that is used for the region to which a broadcast signal cannot be delivered.

6) deliver a base layer over the communication network and deliver an enhancement layer over the broadcast network.

As described above, the hybrid broadcast environment may mean an environment in which multiple layers of media data are provided both over the broadcast network and over the communication network when media data is provided using broadcasting. Also, hybrid transmission may mean transmission using both the broadcast network and the communication network when multiple layers of media data are transmitted.

However, when a broadcast service based on a scalable codec is provided, a specified standard, such as ATSC 3.0, may not be sufficient to provide a broadcast service based on the above-described hybrid transmission. The reason for this is that, in hybrid transmission, both the broadcast network and the communication network are used, but a transport protocol for the broadcast network and a transport protocol for the communication network are different from each other. In the following embodiment, a broadcast service method for providing a broadcast service based on a scalable codec in a hybrid broadcast environment will be described.

FIG. 2 illustrates the structure of a hybrid broadcasting system according to an embodiment.

A system 200 may include a content server 210 and a broadcast server 220.

The content server (contents server) 210 may provide contents to the broadcast server 220.

The broadcast server 220 may include a scalable service encoding unit 221, a service signaling information generation unit 222, a broadcast transmission processing unit 223, a broadcast transmission unit 224, a communication transmission processing unit 225, and a communication transmission unit 226.

The scalable service encoding unit 221 may generate multiple layers of contents by performing scalable service encoding on the contents.

Also, the scalable service encoding unit 221 may generate layer information and dependency information for contents by performing scalable service encoding on the contents.

The layer information may be information describing the generated multiple layers. The dependency information may be information indicating a dependency between the multiple layers.

Further, the scalable service encoding unit 221 may generate a base layer and an enhancement layer for contents by performing scalable service encoding on the contents.

The scalable service encoding unit 221 may transmit the base layer to the broadcast transmission processing unit 223.

The scalable service encoding unit 221 may transmit the enhancement layer to the communication transmission processing unit 225.

The service signaling information generation unit 222 may have an interface for transmitting/receiving information that is used to provide a service based on the scalable codec to/from the scalable service encoding unit 221. Further, the service signaling information generation unit 222 may generate a service-layer signaling message depending on the signaling scheme of a broadcast service based on the scalable codec, which will be described later, and may provide a broadcast service over a broadcast network and a communication network.

The service signaling information generation unit 222 may generate the service-layer signaling message using the layer information and the dependency information. Here, the term "service layer" may indicate multiple layers of contents. The service-layer signaling message may also be referred to as "service-layer signaling information".

The service-layer signaling message may include the layer information and the dependency information. In other words, the service-layer signaling message may be information that describes the multiple layers of contents and indicates a dependency between the multiple layers.

The service signaling information generation unit 222 may send the service-layer signaling message to the broadcast transmission processing unit 223 and the communication transmission processing unit 225.

The broadcast transmission processing unit 223 may perform processing on the information transmitted over the broadcast network. The broadcast transmission processing unit 223 may generate broadcast information including the service-layer signaling message and the base layer.

The broadcast transmission unit 224 may deliver broadcast information to a terminal 240 over the broadcast network.

Here, the terminal 240 may be a receiver for the broadcast network, and may be a receiver for receiving a broadcast conforming to a specified standard, such as an ATSC 3.0 receiver.

The communication transmission processing unit 225 may perform processing on information transmitted over the communication network. The communication transmission processing unit 225 may generate communication information including the service-layer signaling message and the enhancement layer. Here, the communication information may include a specified part of the service-layer signaling message.

The communication transmission unit 226 may deliver the communication information to the terminal 240 over the communication network.

In other words, the terminal 240 may be a device that is capable of receiving information over the broadcast network and the communication network.

Figure 3:
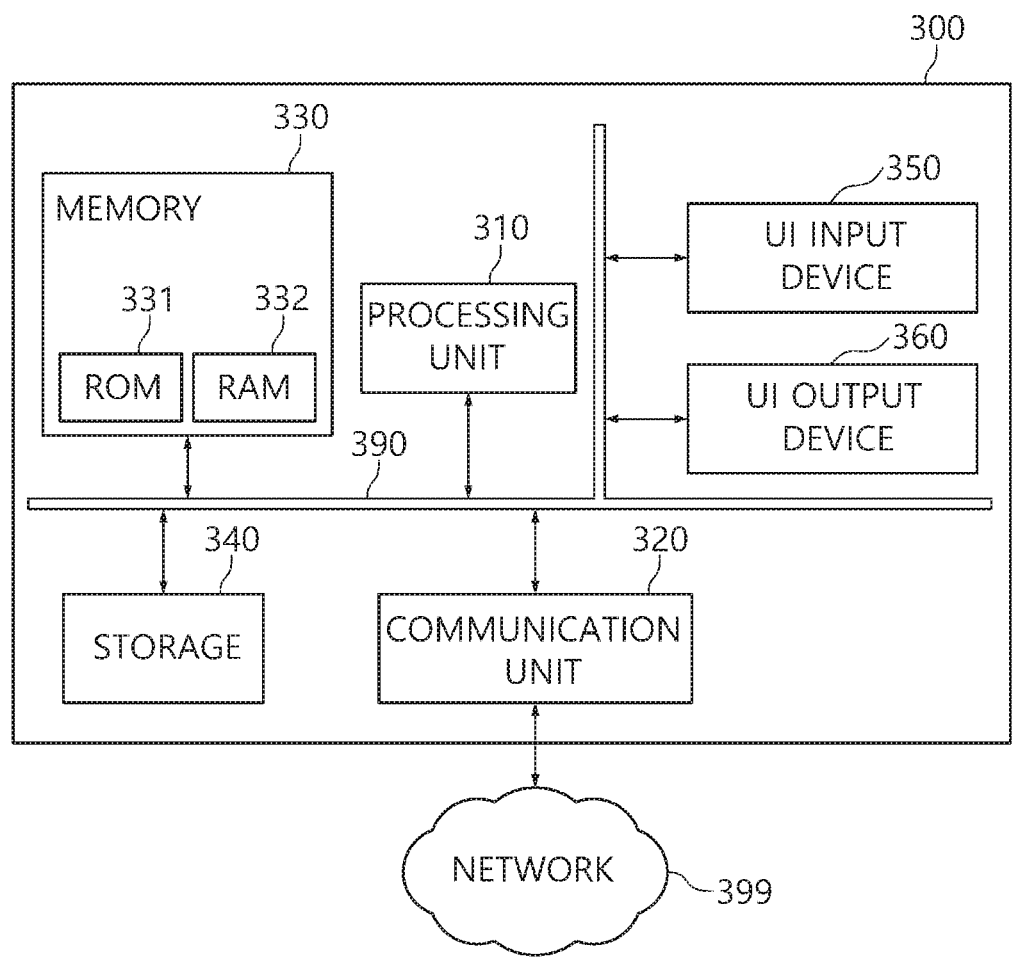
FIG. 3 illustrates the configuration of a broadcast server or the like according to an embodiment.

FIG. 3 illustrates the configuration of a broadcast server according to an embodiment.

A device 300 may be the above-described broadcast server 220. Also, the device 300 may be the above-described terminal 240 and a communication server 230, which will be described later with reference to FIG. 4.

In other words, the device 300 may indicate the (physical) structure of each of the broadcast server 220, the communication server 230, and the terminal 240.

For example, when the device 300 indicates the broadcast server 220, a processing unit 310 may correspond to the scalable service encoding unit 221, the service signaling information generation unit 222, the broadcast transmission processing unit 223, and the communication transmission processing unit 225. A communication unit 320 may correspond to the broadcast transmission unit 224 and the communication transmission unit 226.

The device 300 may include the processing unit 310, memory 330, a user interface (UI) input device 350, a UI output device 360, and storage 340, which communicate with each other through a bus 390. Also, the device 300 may further include the communication unit 320 connected to a network 399.

The processing unit 310 may be a semiconductor device for executing processing instructions stored in a Central Processing Unit (CPU), the memory 330 or the storage 340. The processor unit 310 may be at least one hardware processor.

The processing unit 310 may generate and process a signal, data or information which is input to the device 300, is output from the device 300, or is used in the device 300, and may perform tests, comparison, determination, etc. related to the signal, data or information. In other words, in an embodiment, the generation and processing of data or information and the tests, comparison, and determination related to the data or information may be performed by the processing unit 310.

At least some of elements constituting the processing unit 310 may be program modules, and may communicate with an external device or system. The program modules may be included in the device 300 in the form of operating systems, application modules, and additional program modules.

The program modules may be physically stored in various known storage devices. Also, at least some of the program modules may be stored in a remote storage device that is capable of communicating with the device 300.

Such program modules may include, but are not limited to, a routine, a subroutine, a program, an object, a component, and a data structure for performing functions or operations according to an embodiment or for implementing abstract data types according to an embodiment.

Each of the program modules may be implemented using an instruction or code that is executed by at least one processor of the device 300.

A storage unit may be the memory 330 and/or the storage 340. Each of the memory 330 and the storage 340 may be any of various types of volatile or nonvolatile storage media. For example, the memory 330 may include at least one of Read-Only Memory (ROM) 331 and Random Access Memory (RAM) 332.

The storage unit may store data or information used for the operation of the device 300. In an embodiment, the data or information of the device 300 may be stored in the storage unit.

The device 300 may be implemented in a computer system including a computer-readable storage medium.

The storage medium may store at least one module required by the device 300 to perform operations. The memory 330 may store at least one module, and may be configured such that the at least one module is executed by the processing unit 310.

The functions related to the communication of data or information of the device 300 may be performed through the communication unit 320.

The network 399 may be the above-described broadcast network and/or communication network.

Figure 4:
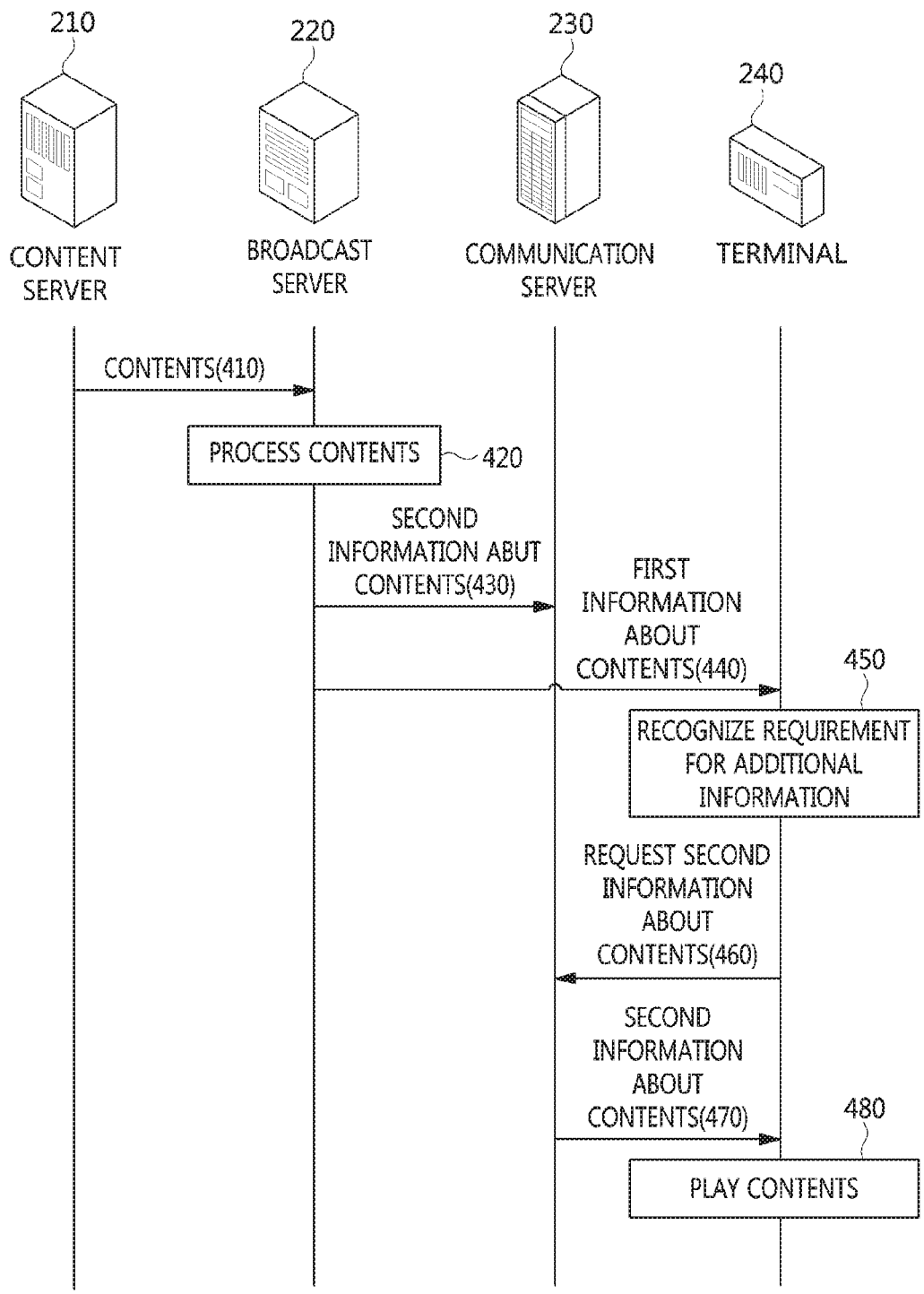
FIG. 4 is a flowchart of a method for providing a broadcast service according to an embodiment.

FIG. 4 is a flowchart of a broadcast service method according to an embodiment.

The flowchart of FIG. 4 may be a broadcast service provision method from the standpoint of the broadcast server 220 and the communication server 230, and may be a broadcast service reception method from the standpoint of the terminal 240.

At step 410, the content server 210 may transmit contents to the broadcast server 220.

At step 420, the broadcast server 220 may process the contents. Here, the processing of the contents may mean the operations of the scalable service encoding unit 221 and the service signaling information generation unit 222, described above with reference to FIG. 2.

The broadcast server 220 may generate multiple layers of contents by processing the contents.

Also, the broadcast server 220 may generate the above-described layer information, dependency information, and service-layer signaling information by processing the contents.

The service-layer signaling information may be abbreviated as "service information".

Further, the broadcast server 220 may generate first information about contents and second information about contents by processing the contents. The first information may correspond to the above-described broadcast information. The second information may correspond to the above-described communication information.

In an embodiment, the first information about contents may include a first layer, among the multiple layers of the contents. The second information about contents may include a second layer, among the multiple layers of the contents.

In an embodiment, the multiple layers may include a base layer and an enhancement layer for a scalable codec. The enhancement layer may include multiple layers.

For example, the first information about contents may include all layers of the contents. The first information about contents may include the base layer and the enhancement layer of the contents.

For example, the second information about contents may include only a part of all layers of the contents. The second information about contents may include the enhancement layer of the contents with the exception of the base layer of the contents. Alternatively, the second information about contents may include only some of multiple enhancement layers of the contents with the exception of the base layer of the contents.

In an embodiment, the first information about contents may include service-layer signaling information. The service-layer signaling information may be information used by the terminal 240 to acquire the second information about contents through the second network (other than through the first network).

Also, the service-layer signaling information may include elements and attributes, which will be described later in the following tables, and may include combinations of the elements and attributes of the following tables.

For example, the service-layer signaling information may include descriptions of the relationships between the components of contents respectively delivered over the first network and the second network. The components may include layers.

For example, the first network and the second network may use different protocols so as to transmit the first information and the second information, respectively. A first protocol by which the first information is delivered over the first network may be ATSC 3.0. A second protocol by which the second information is delivered over the second network may be Dynamic Adaptive Streaming over HTTP (DASH).

For example, the second information may include a period for layers, and the period may include representations. Here, the period may be an interval for media presentation. A contiguous sequence of all periods may constitute a media presentation. The term "representation" may be the collection and encapsulation of one or more media streams formed in a delivery format. Also, the collection and encapsulation may be associated with descriptive metadata. In the second information, the second layer may be primarily classified according to the unit of a period and may be secondarily classified according to the representation.

For example, the first information may include information describing a layer that is delivered over the first network based on the first protocol. The first information will be described in detail later with reference to tables or the like in the following embodiments.

For example, the second information may include information describing a layer that is delivered over the second network based on the second protocol. The second information may include a Media Presentation Description (MPD). The second information will be described in detail later with reference to tables or the like in the following embodiments.

Additionally, the service-layer signaling information may include information describing contents in the second protocol used to transmit the second information over the second network.

For example, the service-layer signaling information may include information describing a dependency between the layer of the first information and the layer of the second information.

For example, the service-layer signaling information may include the identifier of the layer of the second information corresponding to the layer of the first information.

For example, the service-layer signaling information may include the identifier of the layer of the second information that depends on the layer of the first information. Alternatively, the service-layer signaling information may include the identifier of the layer of the second information that the layer of the first information depends on.

At step 430, the broadcast server 220 may transmit the second information about contents to the communication server 230.

Here, step 430 is merely exemplary, and may be omitted or replaced with another step depending on the circumstances.

For example, the communication server 230 may receive contents from the content server 210, and may generate the second information about the contents by autonomously processing the contents. At this time, the broadcast server 220 may neither generate nor transmit the second information about contents.

Alternatively, the broadcast server 220 may transmit information used to generate second information, rather than the second information itself, to the communication server 230.

Alternatively, the broadcast server 220 and the communication server 230 may be physically integrated into a single server, and may be equivalent servers constituting a cloud. Also, the broadcast server 220 may be provided with both an interface for the broadcast network and an interface for the communication network, and may also perform the function of the communication server 230, described above in the embodiment, together with the function of the broadcast server.

At step 440, the broadcast server 220 may transmit the first information about contents over the first network.

The broadcast server 220 may transmit the first information about contents to the terminal 240 over the first network. The terminal 240 may receive the first information about contents over the first network.

The first network may be the broadcast network.

At step 450, the terminal 240 may recognize that additional information, as well as the first information, is required in order to play the contents.

Here, the requirement for additional information may mean that at least some of the multiple layers of the contents cannot be acquired over the broadcast network, and that the quality of at least some of the layers acquired over the broadcast network is lower than a specified reference quality.

For example, the second information may be received for handoff of the terminal 240.

Here, the terminal 240 may output the contents using only the first information. The second information about contents may be information used to output the contents at a higher quality than that when only the first information is used.

The terminal 240 may recognize the method for acquiring the second information about contents using the service-layer signaling information.

For example, the service-layer signaling information may include 1) information specifying the communication server 230 and 2) information specifying the second information, among pieces of information provided by the communication server 230.

At step 460, the terminal 240 may transmit a request for the second information about contents to the communication server 230 over the second network using the service-layer signaling information.

The second network may be the communication network.

At step 470, the communication server 230 may transmit the second information about contents to the terminal 240. The terminal 240 may receive the second information about contents from the communication server 230.

At step 480, the terminal 240 may output or play the contents using the first information about the contents and the second information about the contents.

Hereinafter, embodiments for providing the broadcast service will be described in detail.

User Service Bundle Description MMT

The following Table 1 shows the Extensible Markup Language (XML) format of a user service bundle description fragment for an MPEG Media Transport Protocol (MMTP). Table 1 provides a description of BundleDescriptionMMT conforming to an A/331 standard. For example, the above-described service-layer signaling information may include BundleDescriptionMMT of Table 1.

TABLE 1

| Level | Element or attribute name | Use | Data type | Description |
| --- | --- | --- | --- | --- |
| 1 | BundleDescriptionMMT | | | A root element of User Service Bundle Description for MMTP |
| 2 | UserServiceDescription | 1 | | Single instance of an ATSC 3.0 service |
| 3 | @serviceId | 1 | unsignedShort | Reference to corresponding service entry in LLS (SLT) |
| 3 | @serviceStatus | 0 . . . 1 | Boolean | This specifies the status of this service as active or inactive. |
| 3 | Name | 0 . . . N | string | Name of ATSC 3.0 service |
| 4 | @lang | 1 | lang | Language of ATSC 3.0 service name |
| 3 | ServiceLanguage | 0 . . . N | lang | Available languages of the ATSC 3.0 service |

TABLE 1-continued

| Level | Element or attribute name | Use | Data type | Description |
|---|---|---|---|---|
| 3 | ContentAdvisoryRating | 0 . . . N | sa:CARatingType | This specifies the RRT-based content advisory rating, as defined in the ATSC 3.0 Service Announcement specification A/332. |
| 3 | OtherRatings | 0 . . . N | sa:OtherRatingType | This specifies the Non-RRT content advisory rating, as defined in the ATSC 3.0 Service Announcement specification. |
| 3 | Channel | 1 | | This contains information about the service. |
| 4 | @serviceGenre | 0 . . . 1 | unsignedByte | This attribute indicates the primary genre of the service. |
| 4 | @serviceIcon | 1 | anyURI | This attribute indicates the Uniform Resource Locator (URL) for the icon used to represent this service. |
| 4 | ServiceDescription | 0 . . . N | | This contains service description, possibly in multiple languages. |
| 5 | @serviceDescrText | 1 | String | This attribute indicates a description of the service. |
| 5 | @serviceDescrLang (@service description language) | 0 . . . 1 | Lang | This attribute indicates the language of the serviceDescrText. |
| 3 | MPUComponent | 0 . . . 1 | | A description of the content components of ATSC 3.0 Service delivered as MPUs. |
| 4 | @mmtPackageId (@MMT package identifier) | 1 | String | Reference to an MMT Package for content components of the ATSC 3.0 Service delivered as MPUs |
| 4 | @contentIdSchemeIdUri (@ content identifier scheme identifier) | 0 . . . 1 | anyURI | This attribute indicates a URI to identify the scheme for Content ID associated with the current MMT Package. |
| 4 | @contentIdValue | 0 . . . 1 | String | This attribute indicates the value of Content ID associated with the current MMT Package. |
| 4 | @nextMMTPackageId | 0 . . . 1 | String | Reference to an MMT Package to be used after the one referenced by @mmtPackageId in time for content components of the ATSC 3.0 Service delivered as MPUs |
| 4 | @nextContentIdSchemeIdUri (@ next content identifier scheme identifier URI) | 0 . . . 1 | anyURI | This attribute indicates a URI to identify the scheme for Content ID associated with the next MMT Package. |
| 4 | @nextContentIdValue | 0 . . . 1 | String | This attribute indicates the value of Content ID associated with the next MMT Package. |
| 3 | ROUTEComponent | 0 . . . 1 | | A description of locally cached service contents of ATSC 3.0 Service delivered via ROUTE |
| 4 | @sTSIDUri | 1 | anyURI | Reference to the Service-based Transport Session Instance Description (S-TSID) fragment which provides access-related parameters of the Transport sessions (i.e. LCT channel(s) of ROUTE session(s)) carrying contents of this ATSC 3.0 Service |
| 4 | @apdUri | 0 . . . 1 | anyURI | Reference to the Associated Procedure Description (APD) fragment which contains file-repair-related information |
| 4 | @sTSIDDestinationIpAddress (@ TSID destination IP address) | 0 . . . 1 | IPv4address | A string containing the dotted-IPv4 destination address of the packets carrying S-TSID for this service |
| 4 | @sTSIDDestinationUdpPort | 1 | unsignedShort (port) | Port number of the packets carrying S-TSID for this service |
| 4 | @sTSIDSourceIpAddress (@ TSID source IP address) | 1 | IPv4address | A string containing the dotted-IPv4 source address of the packets carrying S-TSID for this service |
| 4 | @sTSIDMajorProtocolVersion | 0 . . . 1 | unsignedByte | Major version number of the protocol used to deliver the S-TSID for this service |
| 4 | @sTSIDMinorProtocolVersion | 0 . . . 1 | unsignedByte | Minor version number of the protocol used to deliver the S-TSID for this service |

TABLE 1-continued

| Level | Element or attribute name | Use | Data type | Description |
|---|---|---|---|---|
| 3 | BroadbandComponent | 0 1 | | A description of the content components of ATSC 3.0 Service delivered over broadband. |
| 4 | @fullMPDUri | 1 | anyURI | Reference to an MPD fragment which contains descriptions of content components of the ATSC 3.0 Service delivered over broadband. |
| 3 | ComponentInfo (component information) | 0 . . . N | | This contains information about components available in the service. Each component includes information about the component type, component role, component name, component identifier, and component protection flag. |
| 4 | @componentType | 1 | unsignedByte | This attribute indicates the type of the corresponding component |
| 4 | @ComponentRole | 1 | unsignedByte | This attribute indicates the role or kind of the corresponding component |
| 4 | @componentProtectedFlag (@ component-protected flag) | 0 . . . 1 | Boolean | This attribute indicates whether the corresponding component is protected |
| 4 | @componentId | 1 | String | This attribute indicates the identifier of the corresponding component. |
| 4 | @componentName | 0 . . . 1 | string | This attribute indicates the human-readable name of the corresponding component |

The following definitions may be applied to the above Table 1 and the following Tables.

In Table 1 and the following Tables, the category "level" may indicate the indentation level of the corresponding element or attribute. In other words, the term "level" may indicate an inclusive relationship between elements or attributes. An element at a higher level having a smaller value may include an element or an attribute at a lower level having a larger value.

In each row of Table, the element at level N may include an element or attribute at level N+1 listed below the level N. Here, an additional element at level N may not be present between the element at level N and the element or attribute at level N+1. Alternatively, the element or attribute at level N+1 may be included in the element at level N which is above and closest to the element at level N+1.

An element including a specified element or a specified attribute may be designated as a parent element of the specified element or the specified attribute. The element or attribute included in the specified element may be designated as a child element or a child attribute of the specified element.

In Table 1 and the following tables, the category "element or attribute name" may denote the name of an element or an attribute indicated by the item in each row. "@" prefixed to the name may indicate that the corresponding item is an attribute. When "@" is not prefixed to the name of the item, the item may be an element.

In Table 1 and the following Tables, a row indicated by the symbol ". . ." for the category "element or attribute name" represents that the indication of one or more elements or attributes is omitted (for convenience of description).

In Table 1 and the following Tables, the category "use" may indicate the number of elements or attributes.

The case where the value of "use" is "1" may mean that one element or attribute is present.

The case where the value of "use" is 0 . . . 1" may mean that there is no element or attribute or that there is one element or attribute.

The case where the value of "use" is 0 . . . N" may mean that there is no element or attribute or that there are one or more elements or attributes. In other words, the number of elements or attributes is not limited.

The case where the value of "use" is 1 . . . N" may mean that there are one or more elements or attributes.

In Table 1 and the following Tables, the category "data type" may indicate the data type of an element or attribute.

In Table 1 and the following Tables, the category "description" may indicate the meaning of an element or attribute. In the following Tables, for convenience of description, the "description" of an element and an attribute may be omitted.

An additional element stated in the "description" of a specified element or a specified attribute may be a parent element for the specified element or the specified attribute.

In Table 1 and the following Tables, a description of the specified element or specified attributed presented in a specified table may also be applied to the specified element or attribute in another table. In other words, the description of the same element or the same attribute may be made in one table, and may be omitted in other tables. Alternatively, the tables in the embodiments may be combined with each The following embodiments may be described based on Table 1. In other words, the content of Table 1 may also be applied in common to the following embodiments, which will be described later, and each embodiment may be described based on the supplementation, differences, and changes of the content of Table 1.

Figure 5:
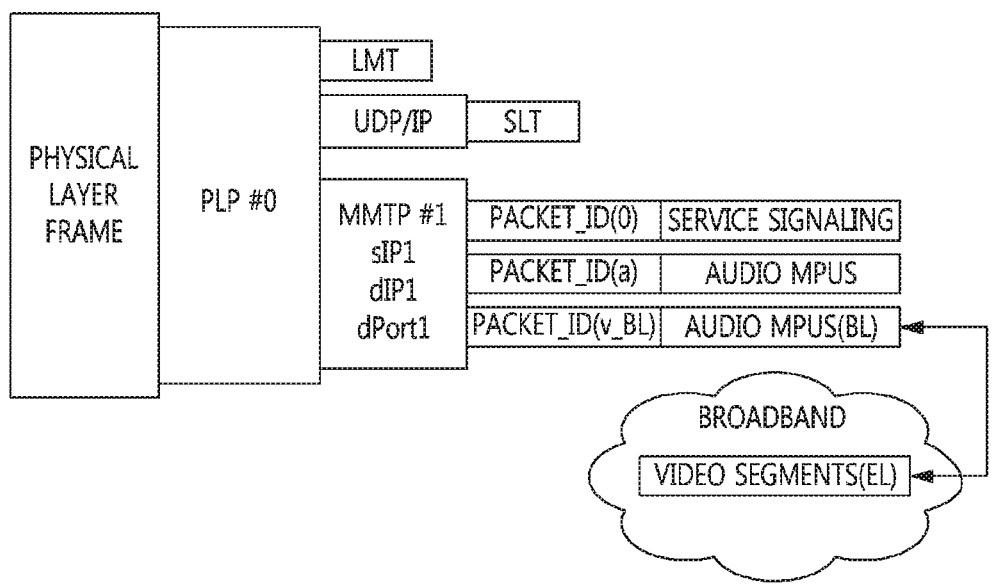
FIG. 5 illustrates a scheme for providing a broadcast service based on a scalable codec in a hybrid broadcast environment according to an example.

Provision of Scalable Codec-Based Broadcast Service in Hybrid Broadcast Environment FIG. 5 illustrates a scheme for providing a scalable codec-based broadcast service in a hybrid broadcast environment according to an example.

In FIG. 5, a scheme in which a base layer is delivered over a broadcast network and an enhancement layer is delivered over a communication network is illustrated.

For transmission over the broadcast network, the base layer may be delivered based on an MMTP.

In a hybrid broadcast environment, as illustrated in FIG. 5, even if the scalable codec-based broadcast service can be configured, the following problem may arise in a service-layer signaling scheme conforming to a standard such as ATSC 3.0.

For the scalable codec-based broadcast service, there is a need to notify the terminal 240 of information indicating that there is a dependency of the scalable codec on the base layer. Such notification must be provided at a specific level in the service-layer signaling information. The specified level may be a level at which enhancement layer video transmission information is provided.

However, as illustrated in FIG. 5, when a base layer delivered over the broadcast network and an enhancement layer delivered over a broadband network are delivered through different transport protocols, the method for providing information about the base layer and the enhancement layer to the terminal 240 may be unclear.

As transport protocols configuring a hybrid broadcast, an MMTP, Real-time Object delivery over Unidirectional Transport (ROUTE), Dynamic Adaptive Streaming over HTTP (DASH), or the like may be used.

In FIG. 5, the base layer is exemplified as being delivered via an MMT protocol (MMTP) and the enhancement layer is exemplified as being delivered via a DASH protocol. In this case, the base layer may be delivered as an MPEG Media Transport (MMT) asset. Therefore, information indicating that the dependency of the enhancement layer on the base layer is present must be able to be described in a Media Presentation Description (MPD), and the MPD in which an association between the layers is described must be able to be delivered to the terminal 240.

The term "association" between layers may indicate that the layers are used to constitute a single service. Alternatively, the term "association" between the layers may indicate that the layers are used to provide a specific function of a service, such as a handoff function.

Here, the layers may be delivered over different transport networks, respectively. In other words, "association" may indicate the relationship between the layers respectively delivered over different transport networks.

Such a layer may be a stream. Therefore, "association" between streams may mean that streams constitute a service together. In tables or the like in the following embodiments, an association between streams may mean an association between layers.

The term "association" may include at least one of "dependency" and "replacement".

For example, such association may refer to "dependency". An association between a first layer and a second layer may mean that the first layer depends on the second layer. Here, the fact that the first layer depends on the second layer may mean that the second layer is required in order to use the first layer. In other words, the first layer may be a dependent layer or an enhancement layer. The second layer may be a complementary layer or a base layer.

For example, the association may refer to "replacement". The association between the first layer and the second layer may mean that the first layer can replace the second layer. Alternatively, the association between the first layer and the second layer may mean that the first layer can replace the second layer for a service, such as a handoff service, and may means that, for such replacement, content of the first layer is identical to that of the second layer.

The associated layers may be simulcasted over different networks. For example, the layers that can be replaced with each other may be simulcasted over different networks, and one of the layers may be used depending on the service and/or the function.

When the method of describing such an association is not present, a problem may arise in hybrid broadcasting, and thus the method of describing the association is required. Hereinafter, embodiments for describing an association will be described.

Method Using ComponentRole Information of MMT

FIG. 6 illustrates a method using ComponentRole information to provide a scalable codec-based service according to an example.

ComponentRole (i.e. component function) of MMT may be the attribute of a media component. When media components having the same componentType are present among media components constituting a service, ComponentRole may be an attribute value for describing the role of each media component. In other words, the attribute componentRole of a specified media component may describe the role of the specified media component, among media components having the same componentType.

For the case where the value of componentType of the media component is "1" (here, "1" may indicate "video"), the use (purpose) of ComponentRole may be extended, as shown in the following Table 2.

TABLE 2

| Value of ComponentRole of media component | Use |
| --- | --- |
| 1 | This indicates that the media component is a base layer of the scalable codec |
| 2 | This indicates that the media component is a first enhancement layer of the scalable codec. |
| 3 | This indicates that the media component is a second enhancement layer of the scalable codec. |

In other words, in a scalable service, the value of ComponentRole of the media component may indicate the type of layer to which a media stream transmitted by the media component corresponds.

Such extension may designate values of 1 to 25, indicating a reserved area for ComponentRole, as content for the scalable codec. Also, as in the current standard, a value of '0' of ComponentRole may be defined as a value indicating a primary video.

ComponentRole may also be used to describe information for a handoff service in addition to the information related to a scalable service.

Method Using ComponentRole Information and ComponentInfo Information of MMT

In order to provide a scalable codec-based service, ComponentRole and ComponentInfo (i.e. component information) may be used.

In accordance with the embodiment described above with reference to FIG. 6, the following problems 1) and 2) may occur when only User Service Bundle Description (USBD) information and User Service Description (USD) information are used.

1) It is impossible to indicate information meaning that media component "Rep_V100" is being delivered over broadband.

2) It is impossible to indicate an association between a media component "Rep_V100" and MMT Asset (V_BL_asset of FIG. 6).

These problems may be due to the fact that a portion describing a component in relation to service delivery and a portion describing ComponentInfo are separated in the current ATSC 3.0 standard.

In greater detail, the components of MMT USBD may be divided into and described as MPUComponent, ROUTEComponent, and BroadbandComponent, as shown in the following Table 3, and ComponentInfo may be described separately from the description of these components.

TABLE 3

| Level | Element or attribute name | Use | Data type |
|---|---|---|---|
| 1 | BundleDescriptionMMT | | |
| 2 | UserServiceDescription | 1 | |
| 3 | ... | | |
| 3 | MPUComponent | 0 ... 1 | |
| 4 | ... | 1 | String |
| 3 | ROUTEComponent | 0 ... 1 | |
| 4 | ... | 1 | anyURI |
| 3 | BroadbandComponent | 0 ... 1 | |
| 4 | @fullMPDUri | 1 | anyURI |
| 3 | ComponentInfo | 0 ... N | |
| 4 | @componentType | 1 | unsignedByte |
| 4 | @ComponentRole | 1 | unsignedByte |
| 4 | @componentProtectedFlag | 0 ... 1 | Boolean |
| 4 | @componentId | 1 | String |
| 4 | @componentName | 0 ... 1 | String |

In accordance with the current ATSC 3.0 standard, ComponentInfo, which is information about components constituting a service, may be described at a level lower than that of UserServiceDescription. Also, in accordance with the current ATSC 3.0 standard, ComponentInfo may be defined such that it is necessarily described when MPUComponent is present.

However, the provision of information about components associated with a service may be required even for ROUTEComponent and BroadbandComponent. In particular, when a service is provided through interoperation between BroadbandComponent and MPUComponent, the provision of information related to interoperation between BroadbandComponent and MPUComponent may be necessarily required.

Therefore, in order to solve this problem, in embodiments, ComponentInfo may be described as being a child element of MPUComponent, ROUTEComponent and BroadbandComponent, which indicate transmission information. In other words, ComponentInfo may be described as having a format dependent on the above-described transport protocol when information about the transport protocol is provided.

By means of this definition, the problem in which information about components associated with a service must be provided even for the above-described ROUTEComponent and BroadbandComponent may be solved.

As described above, the following Table 4 shows a scheme for describing ComponentInfo as being a child component of MPUComponent, ROUTEComponent, and BroadbandComponent, which indicate the configuration of transmission information when providing information about the components of MMT USBD.

TABLE 4

| Level | Element or attribute name | Use | Data type |
|---|---|---|---|
| 1 | BundleDescriptionMMT | | |
| 2 | UserServiceDescription | 1 | |
| 3 | ... | | |
| 3 | MPUComponent | 0 ... 1 | |
| 4 | ... | 1 | String |
| 4 | ComponentInfo | 0 ... N | |
| 5 | @componentType | 1 | unsignedByte |
| 5 | @ComponentRole | 1 | unsignedByte |
| 5 | @componentProtectedFlag | 0 ... 1 | Boolean |
| 5 | @componentId | 1 | String |
| 5 | @componentName | 0 ... 1 | String |
| 3 | ROUTEComponent | 0 ... 1 | |
| 4 | ... | 1 | anyURI |
| 4 | ComponentInfo | 0 ... N | |
| 5 | @componentType | 1 | unsignedByte |
| 5 | @ComponentRole | 1 | unsignedByte |
| 5 | @componentProtectedFlag | 0 ... 1 | Boolean |
| 5 | @componentId | 1 | string |
| 5 | @componentName | 0 ... 1 | string |
| 3 | BroadbandComponent | 0 ... 1 | |
| 4 | @fullMPDUri | 1 | anyURI |
| 4 | ComponentInfo | 0 ... N | |
| 5 | @componentType | 1 | unsignedByte |
| 5 | @ComponentRole | 1 | unsignedByte |
| 5 | @componentProtectedFlag | 0 ... 1 | Boolean |
| 5 | @componentId | 1 | String |
| 5 | @componentName | 0 ... 1 | String |

As shown in Table 4, when ComponentInfo is represented as the child element of MPUComponent, ROUTEComponent, and BroadbandComponent, information indicating that content described in each ComponentInfo is basically associated with any one of an MPU transmission method, a ROUTE transmission method, and a Broadband transmission method may be represented.

Therefore, when a USBD is configured, as described above, the terminal 240 may recognize that content described in MPUComponent is information about an MMT asset related to MPU transmission, that content described in ROUTEComponent is content related to data transmitted via ROUTE, and that content described in BroadbandComponent is content related to a DASH segment transmitted based on HTTP.

The asset ID (i.e. asset_ID) of an MMT Package table (MP table) or the representation ID of DASH may indicate a media component that is actually delivered to the terminal 240. Therefore, when ComponentInfo is described in the same way as described in Table 4, @componentId, which is the attribute of ComponentInfo, may be described as being identical to the asset_ID of the MP table or the representation ID of DASH. In other words, @componentId, which is the attribute of ComponentInfo, may be the same as the asset_ID of the MP table which delivers media components, or the representation ID of DASH.

FIG. 7 illustrates the configuration of service-layer signaling information based on a scalable codec according to an example.

In FIG. 7, the configuration of service-layer signaling information based on a scalable codec conforming to the scheme described in Table 4 may be depicted.

In accordance with the code of FIG. 7, two media components may be transmitted as MMT components, and one of the two media components may be an audio component and the other may be a video component.

Through the video component, a base layer for a scalable codec service may be delivered. In other words, the video component of MMT may be a base layer.

Also, according to the code of FIG. 7, there may be no media component that is delivered through a ROUTE protocol.

Further, according to the code of FIG. 7, a media component delivered over broadband may be a video component, and an enhancement layer for the scalable codec service may be delivered through the video component. In other words, the broadband video component may be an enhancement layer.

Here, information about a media asset associated with the base layer that is delivered via an MMT protocol may indicate that componentId is "V_BL_asset". By means of the delivery of information, the terminal 240 may recognize that, among asset IDs defined in the MP table, "V_BL_asset" indicates a media asset actually delivered through an MMTP.

Further, information about a media asset associated with the enhancement layer that is delivered as BroadbandComponent may indicate that componentId is "Rep_v100". By means of the delivery of this information, the terminal 240 may recognize that "Rep_v100" is a representation ID used to actually play the media of DASH.

When the above-described method is used, the terminal 240 may rapidly recognize information about media components constituting the service through a description in USBD, which is the entry point of service-layer signaling information. Also, by means of this description, the terminal 240 may configure a service without parsing a transport protocol level or a media codec level, such as MMT or DASH.

When there is a specific association between media data (i.e. a layer) delivered via MMT and media data (i.e. a layer) delivered via DASH, as well as a scalable codec-based broadcast service, the above-described information may also be used to indicate information about such association.

SHVC handoff service based on broadcast MMT and broadband DASH

When a service based on a broadcast MMT and broadband DASH (i.e. a service using both a broadcast network and a communication network) is provided based on "A/331 ATSC candidate standard revision: signaling, delivery, synchronization and error protection" standards, the following constraints may be present in the ATSC 3.0 standard.

Constraint 1: ComponentInfo element of UserServiceDescription of BundleDescriptionMMT is limited so that related information is described only for the delivery of an MPU. In other words, the ComponentInfo element may describe information only for a broadcast that uses MMT.

Constraint 2: @componentId, which is the attribute of the ComponentInfo element, is limited such that it is identical to the asset ID defined in the MP table.

In other words, the above-described elements and attributes may be defined as shown in the following Table 5.

TABLE 5

| Element or attribute name | Description |
| --- | --- |
| ComponentInfo | This contains information about components available in the service. Each component includes information about the component type, component role, component name, component identifier, and component protection flag. This element should be present when MPUComponent is present. |

TABLE 5-continued

| Element or attribute name | Description |
| --- | --- |
| @componentId | This attribute indicates the identifier of the corresponding component. The value of this attribute should be the same as the asset ID in the MP table corresponding to the component. |

When information related to ComponentInfo is limited to MMT as in the case of the above-described existing standard, the relationship between components constituting the service may not be freely defined.

The service may be configured using various components, and these various components may be delivered through various schemes, as defined in A/331.

In the case where information related to ComponentInfo is limited to MMT, as in the case of the above-described existing standard, when a single service simultaneously uses various delivery protocols, such as a broadcast MMTP (i.e. delivery of an MPU), broadcast ROUTE (broadcast transmission object), broadband transmission (i.e. transmission via DASH and/or HTTP), and Non-Real Time (NRT) transmission (i.e. transmission via ROUTE), it may be difficult to configure a service. In particular, in this case, when a base layer and an enhancement layer of SHVC are respectively delivered via different protocols, such a service provision method may not be definitely described. Also, when a handoff service, in which switching between delivery over a broadcast network and delivery over a broadband network is performed, is provided, the service provision method may not be definitely described.

Method for Deleting, Through Update of A/331 Standard, Limitation of ComponentInfo to MMT and Extending Application Range of @componentId In order to solve the above-described problems, the definitions of ComponentInfo and @componentId may be changed to those in the following Table 6.

TABLE 6

| Element or attribute name | Description |
| --- | --- |
| ComponentInfo | This contains information about components available in the service. Each component includes information about the component type, component role, component name, component identifier, and component protection flag. (A constraint indicating that ComponentInfo should be present when MPUComponent is present is not applied). |
| @componentId | This attribute indicates the identifier of the corresponding component. The value of this attribute should be the same as 1) the asset ID in the MP table corresponding to the component or 2) the associated DASH representation ID in the MPD. |

As shown in the description in Table 6, when the A/331 standard is changed, the A/331 standard may also be applied to another transmission (in particular, broadband transmission via DASH and/or HTTP) which does not deliver ComponentInfo via MMT.

The attribute @ComponentRole may indicate the role or kind of the corresponding component.

For audio (i.e. when the value of @componentType of the component is 0), the value of @ComponentRole may be defined as shown in the following Table 7.

TABLE 7

| Value of ComponentRole | Role or kind of audio component |
| --- | --- |
| 0 | Complete main |
| 1 | Music and Effects |
| 2 | Dialog |
| 3 | Commentary |
| 4 | Visually Impaired |
| 5 | Hearing Impaired |
| 6 | Voice-Over |
| 7-254 | ATSC Reserved |
| 255 | Unknown |

For video (i.e. when the value of (@componentType of the component is 1), the value of @ComponentRole may be defined as shown in the following Table 8.

TABLE 8

| Value of @ComponentRole | Role or kind of video component |
| --- | --- |
| 0 | Primary Video |
| 1-254 | ATSC Reserved |
| 255 | Unknown |

For video (i.e. when the value of @componentType of the component is 1), the value of @ComponentRole is defined as shown in the following Table 9, and thus the SHVC handoff service may be more definitely described.

TABLE 9

| Value of @ComponentRole | Role or kind of component |
| --- | --- |
| 0 | Primary Video |
| 1 | Base layer for SHVC-based scalable coding |
| 2 | Enhancement layer for SHVC-based scalable coding |
| 3 | Base layer for SHVC-based scalable coding having handoff service |
| 4 | Enhancement layer for SHVC-based scalable coding having handoff service |
| 5-254 | ATSC Reserved |
| 255 | Unknown |

Figure 8:
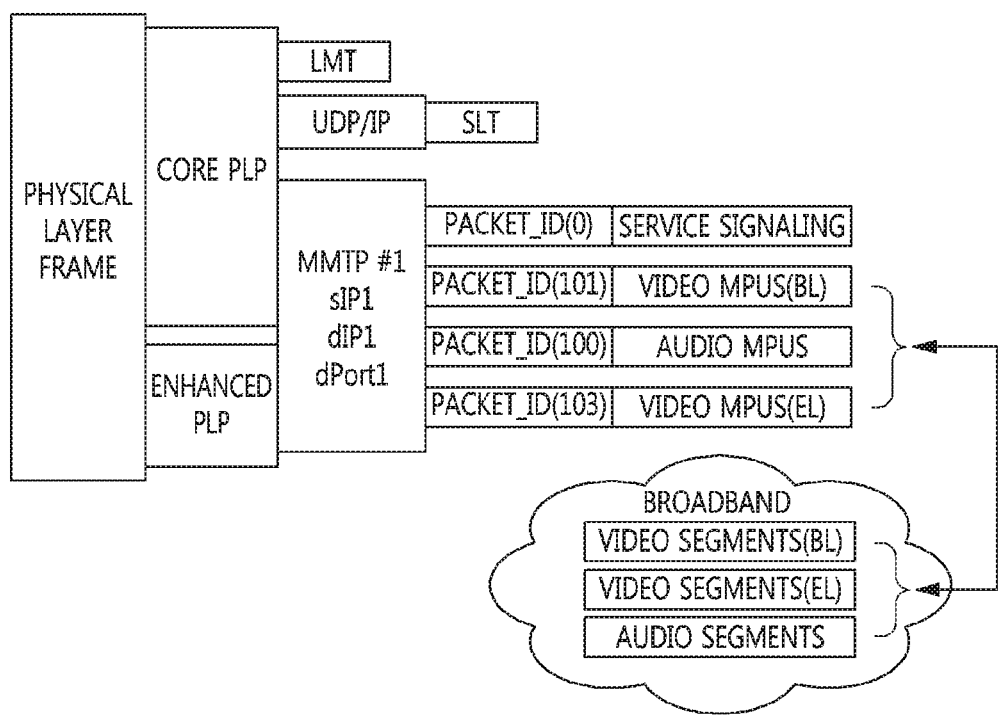
FIG. 8 illustrates a scheme for providing a hybrid SHVC handoff service in MMT-based hybrid broadcasting according to an example.

FIG. 8 illustrates a scheme for providing a hybrid SHVC handoff service in MMT-based hybrid broadcasting according to an example.

Figure 9:
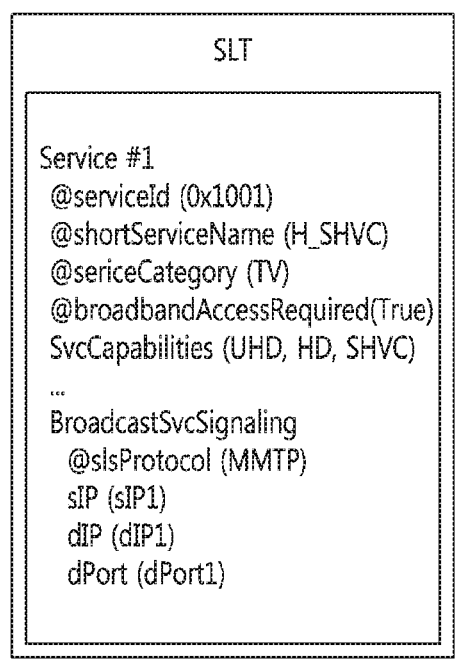
FIG. 9 illustrates the SLT of FIG. 8 according to an example.

FIG. 9 illustrates the Service List Table (SLT) of FIG. 8 according to an example.

In FIG. 9, an SLT for the hybrid SHVC handoff service provision scheme of FIG. 8 is described.

Figure 10:
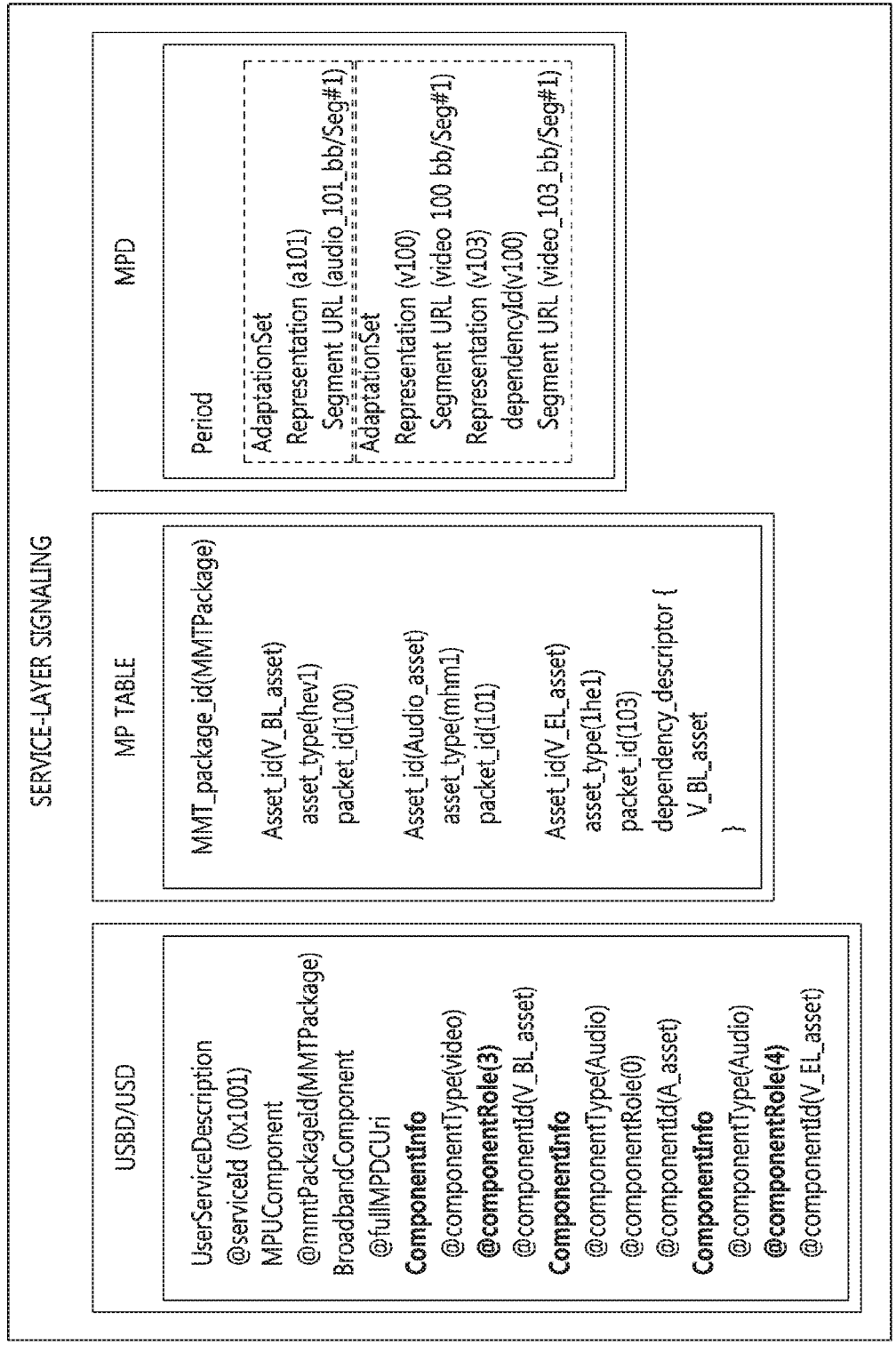
FIG. 10 illustrates the service signaling of FIG. 8 according to an example.

FIG. 10 illustrates the service signaling of FIG. 8 according to an example.

In FIG. 10, service-layer signaling information indicating service signaling of FIG. 8 is illustrated.

As illustrated in the drawing, the service-layer signaling information may include USBD/USD, an MP table, and an MPD.

The USBD/USD may define overall ATSC 3.0 services.

The MP table may describe MMT service delivery over broadcast.

The MPD may be a DASH media presentation description for delivery over broadband.

When a handoff service is provided based on MMTP, the ComponentRole attribute of the ComponentInfo element for a video component may be newly defined, as described above with reference to the foregoing Table 9.

Method for Changing MMT Standard or Limiting Application Range of MMT in A/331 Standard In order to indicate that data delivered via broadcast MMT and data delivered via broadband DASH constitute a service together, a location count (location_count) may be used to describe a method for delivering MMT assets.

According to the existing MMT standard, location_count may provide the number of pieces of location information for the corresponding asset. When the asset is delivered through one location, location_count may be set to "1". When bulk delivery is achieved, location_count may be set to a value other than "1". Here, the term "bulk delivery" may mean a scheme in which MPUs contained in assets are delivered through multiple channels. When a single asset is delivered at multiple locations, the terminal 240, which is an entity for receiving the MMT asset, must be able to receive all MPUs of the asset from all indicated locations.

As described above, location_count conforming to the existing MMT standard may describe only information about MPUs. Therefore, in order to use location_count in ATSC 3.0, the application range of location_count must be able to be extended to service components of ATSC 3.0 including the asset of the MPUs, and the definition of location_count must be able to be changed such that information about service components of ATSC 3.0 can be represented.

In other words, location_count may provide the number of pieces of location information for related components. When each component is delivered through one location, location_count may be set to "1". When bulk delivery is achieved, location_count may be set to a value other than "1". Here, the term "bulk delivery" may mean a scheme in which related components are delivered through multiple channels. When a single component is delivered at multiple locations, the terminal 240, which is an entity for receiving the component, must be able to receive all related components from all indicated locations.

FIG. 11 illustrates an MP table depending on the change of an MMT standard or the limitation of the application range of the MMT standard according to an example.

In FIG. 11, the structure "MP Table" may represent the Uniform Resource Locator (URL) of a DASH segment by an asset.

FIG. 12 illustrates the setting of an MMT package and an asset ID depending on the change of an MMT standard or the limitation of the application range of the MMT standard according to an example.

In FIG. 12, "location count (2)" may indicate that the corresponding layer is provided from two locations.

In order to indicate the location of the layer, MMT_general_location_information (MMT_general_location_info) may be used.

In FIG. 12, "packet_id(100)", which is MMTgeneral_location_info, may indicate a broadcast base layer.

Also, "URL(video_100_bb/Seg #1)", which is MMT_general_location_info, may specify the location of a broadband base layer that is a representation delivered via DASH.

Further, "packet_id(103)", which is MMT_general_location_info, may indicate a broadcast enhancement layer.

Furthermore, "URL(video_103_bb/Seg #1)", which is MMT_general_location_info, may specify the location of a broadband enhancement layer that is a representation delivered via DASH.

As described above, in accordance with an embodiment, the definitions of elements and attributes, such as ComponentInfo and @componentType, may be changed to be suitable for a hybrid broadcast. The elements and attributes may be changed to those in additional alternatives, which will be described below.

First Alternative for Definition of Elements and Attributes

The foregoing definition of elements and attributes may be changed as shown in the following Table 10.

TABLE 10

| Element or attribute name | Description |
| --- | --- |
| ComponentInfo | This contains information about components available in the service. Each component includes information about the component type, component role, component name, component identifier, and component protection flag. (A constraint indicating that ComponentInfo should be present when MPUComponent is present is not applied). |
| @componentType | This attribute indicates the type of the corresponding component. A value of 0 indicates an audio component. A value of 1 indicates a video component. A value of 2 indicates a closed-caption component. A value of 3 indicates an audio component for handoff. A value of 4 indicates a video component for handoff. A value of 5 indicates a closed-caption component for handoff. Values of 6 and 7 are ATSC reserved. |
| @ComponentRole | This attribute indicates the role or kind of the corresponding component. For audio (i.e. when the value of the componentType attribute is 0), the value of the ComponentRole attribute is defined as shown in the foregoing Table 7. For video (i.e. when the value of the componentType attribute is 1), the value of the ComponentRole attribute is defined as shown in the foregoing Table 8. For a closed caption (i.e. when the value of the componentType attribute is 2), the value of the ComponentRole attribute is defined as shown in the following Table 11. When the value of @componentType attribute is a value between 3 and 7, the value of @ComponentRole should be 255. |
| @componentId | This attribute indicates the identifier of the component. The value of this attribute should be the same as 1) the asset ID in the MP table corresponding to the component or 2) the associated DASH representation ID in the MPD. When the same component is intended to be delivered over broadcast and broadband (e.g. for supporting handoff), the same value should be used both in the MP table and in the MPD. |

TABLE 11

| Value of @ComponentRole | Role or kind of closed-caption component |
| --- | --- |
| 0 | Normal |
| 1 | Easy Reader |
| 2-254 | ATSC Reserved |
| 255 | Unknown |

Second Alternative for Definition of Elements and Attributes

The foregoing definition of elements and attributes may be changed as shown in the following Table 12.

TABLE 12

| Element or attribute name | Description |
| --- | --- |
| ComponentInfo | This contains information about components available in the service. Each component includes information about the component type, component role, component name, component identifier, and component protection flag. (A constraint indicating that ComponentInfo should be present when MPUComponent is present is not applied). |
| @componentType | This attribute indicates the type of the corresponding component. A value of 0 indicates an audio component. A value of 1 indicates a video component. A value of 2 indicates a closed-caption component. Values of 3 to 7 are ATSC reserved. |
| @ComponentRole | This attribute indicates the role or kind of the corresponding component. For audio (i.e. when the value of the componentType attribute is 0), the value of the ComponentRole attribute is defined as shown in the following Table 13. For video (i.e. when the value of the componentType attribute is 1), the value of the ComponentRole attribute is defined as shown in the following Table 14. For a closed caption (i.e. when the value of the componentType attribute is 2), the value of the ComponentRole attribute is defined as shown in the following Table 15. |

TABLE 12-continued

| Element or attribute name | Description |
| --- | --- |
|  | When the value of @componentType attribute is a value between 3 and 7, the value of @ComponentRole should be 255. |
| @componentId | This attribute indicates the identifier of the corresponding component. The value of this attribute should be the same as 1) the asset ID in the MP table corresponding to the component or 2) the associated DASH representation ID in the MPD. When the same component is intended to be delivered over broadcast and broadband (e.g. for supporting handoff), the same value should be used both in the MP table and in the MPD. |

TABLE 13

| Value of @ComponentRole | Role or kind of audio component |
| --- | --- |
| 0 | Complete main |
| 1 | Music and Effects |
| 2 | Dialog |
| 3 | Commentary |
| 4 | Visually Impaired |
| 5 | Hearing Impaired |
| 6 | Voice-Over |
| 7 | Complete main for handoff |
| 8 | Music and Effects for handoff |
| 9 | Dialog for handoff |
| 10 | Commentary for handoff |
| 11 | Visually Impaired for handoff |
| 12 | Hearing Impaired for handoff |
| 13 | Voice-over for handoff |
| 14-254 | ATSC Reserved |
| 255 | Unknown |

TABLE 14

| Value of @ComponentRole | Role or kind of video component |
| --- | --- |
| 0 | Primary Video |
| 1 | Primary video for handoff |
| 2-254 | ATSC Reserved |
| 255 | Unknown |

TABLE 15

| Value of @ComponentRole | Role or kind of closed-caption component |
| --- | --- |
| 0 | Normal |
| 1 | Easy Reader |
| 2 | Normal for handoff |
| 3 | Easy reader for handoff |
| 4-254 | ATSC Reserved |
| 255 | Unknown |

Third Alternative for Definition of Elements and Attributes

The foregoing definition of elements and attributes may be changed as shown in the following Table 16.

TABLE 16

| Element or attribute name | Description |
| --- | --- |
| ComponentInfo | This contains information about components available in the service. Each component includes information about the component type, component role, component name, component identifier, and component protection flag. (A constraint indicating that ComponentInfo should be present when MPUComponent is present is not applied). |
| @componentType | This attribute indicates the type of the corresponding component. A value of 0 indicates an audio component. A value of 1 indicates a video component. A value of 2 indicates a closed-caption component. Values of 3 to 7 are ATSC reserved. |
| @ComponentRole | This attribute indicates the role or kind of the corresponding component. For audio (i.e. when the value of the componentType attribute is 0), the value of the ComponentRole attribute is defined as shown in the foregoing Table 7. For video (i.e. when the value of the componentType attribute is 1), the value of the ComponentRole attribute is defined as shown in the foregoing Table 8. For a closed caption (i.e. when the value of the componentType attribute is 2), the value of the ComponentRole attribute is defined as shown in the foregoing Table 11. When the value of the @componentType attribute is a value between 3 and 7, the value of @ComponentRole should be 255. |
| @componentId | This attribute indicates the identifier of the component. The value of this attribute should be the same as 1) the asset ID in the MP table corresponding to the component or 2) the associated DASH representation ID in the MPD. When the same component is intended to be delivered over broadcast and broadband (e.g. for supporting handoff), the asset ID in the MP table and the representation ID in the MPD should be indicated in a single string. In this case, the value of componentId may be an asset ID followed by a representation ID separated by a space. That is, the value of componentId may be a concatenation of an asset ID, a space, and a |

TABLE 16-continued

| Element or attribute name | Description |
|---|---|
| | representation ID. Alternatively, the value of componentId may include an asset ID and a representation ID, and a specified separator may be interposed between the asset ID and the representation ID. |

Method for Using DASH Segments as MMT Assets

Referring back to FIG. 5, the scheme for providing a scalable codec-based broadcast service in a hybrid broadcast environment according to an example is illustrated in FIG. 5.

Figure 13:
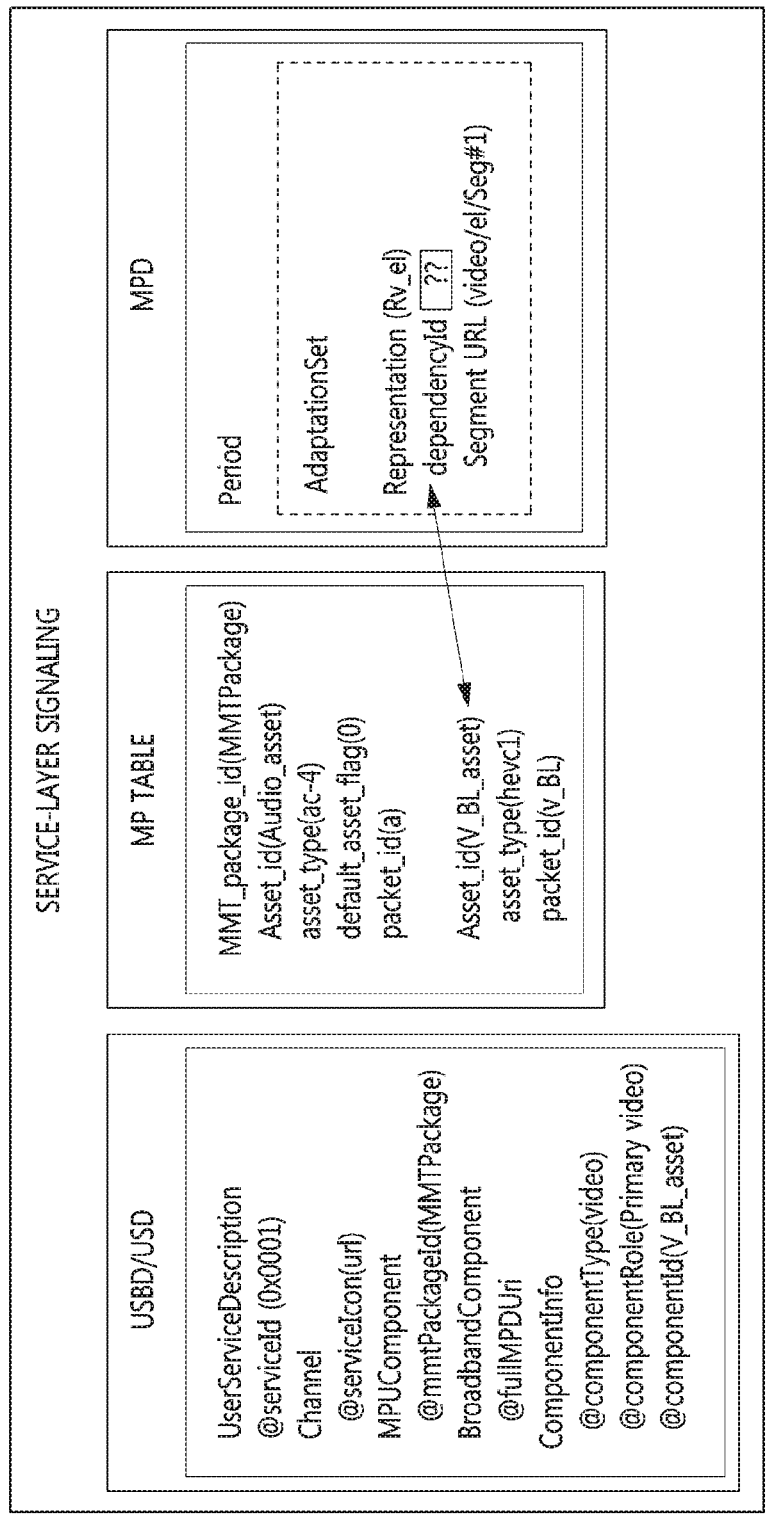
FIG. 13 illustrates service-layer signaling according to an example.

The SLT of FIG. 5 may be represented as illustrated in FIG. 13.

FIG. 13 illustrates service-layer signaling according to an example.

In accordance with the signaling scheme of FIG. 13, because transport protocols having different standards are used for multiple layers, dependency information about dependencies between the multiple layers may not be represented in order to ensure compatibility with the transport protocols.

For example, at the level at which video transmission information for an enhancement layer is provided, notification that the dependency on the base layer is present must be able to be provided. In this case, since the base layer is delivered as an MMT asset, the fact that the dependency of the enhancement layer on the base layer is present may not be described in an MPD.

Also, in accordance with the signaling scheme of FIG. 13, notification that the same content is delivered over an additional network or via an additional protocol so as to provide for a handoff service may not be provided to the terminal 240.

The following Table 17 shows a description of the value of location_type.

The USBD/USD may describe the delivery of an MMT service over broadcast.

The MPD may be a DASH MPD for delivery over broadband.

Signaling Details for MMT and DASH

Referring back to FIG. 8, FIG. 8 illustrates a scheme for providing a hybrid SHVC handoff service in MMT-based hybrid broadcasting according to an example.

Figure 15:
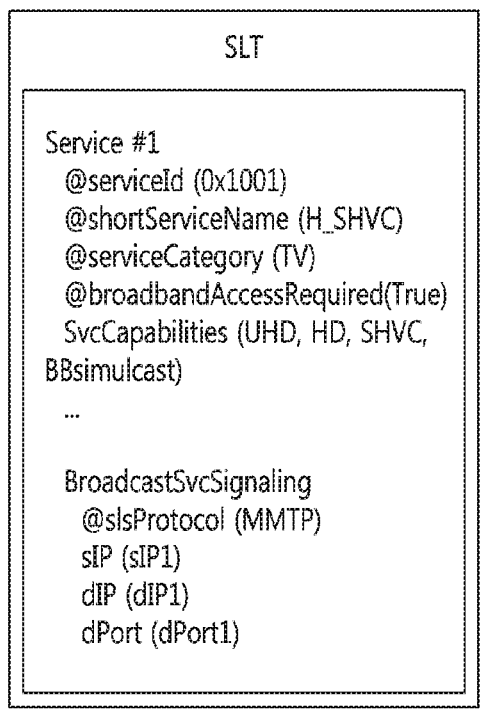
FIG. 15 illustrates an SLT according to an example.

FIG. 15 illustrates a Service List Table (SLT) according to an example.

The SLT of FIG. 15 may be an SLT for the SHVC handoff service provision scheme of FIG. 8.

In the SLT described above with reference to FIG. 9, a field value specifying a service in which the same content as that delivered over a broadcast network is delivered over a broadband network may not be defined. That is, in the SLT, described above with reference to FIG. 9, the fact that the current service is a service for a handoff may not be specified. In order to solve this problem, the fact that the current service is a broadband simultaneous casting (i.e. "BBSimulcast") service may be required to be specified in "SvcCapabilities" indicating the functions of a service level.

As illustrated in FIG. 15, the SvcCapabilities item of SLT may include "BBsimulcast" item. The "BBsimulcast" item may indicate that, as the functions of the service level, broadband simulcasting is provided. Here, broadband simulcasting may mean that the same content (e.g. a specified layer) as content (e.g. a specified layer) delivered over the broadcast network is also delivered over a broadband network.

TABLE 17

| Value of location_type | Description |
|---|---|
| 0x00 | An asset in the same MMTP packet flow as the one that carries the data structure to which MMT_general_location_info() belongs |
| 0x01 | MMTP packet flow over UDP/IP (version 4) |
| 0x02 | MMTP packet flow over UDP/IP (version 6) |
| 0x03 | A program within an MPEG-2 transport stream (TS) in a broadcast network. This program is indicated by a Program Map Table Program ID (PMT PID) described in ISO/IEC 13818-1. |
| 0x04 | An Elementary Stream (ES) in MPEG-2 TS on an IP broadcast network |
| 0x05 | URL |
| 0x06 | Reserved for private location information |
| 0x07 | The same signaling message as the one that carries the data structure to which this MMT_general_location_info() belongs |
| 0x08 | A signaling message delivered in the same data path as the one that carries the data |

Referring back to FIGS. 8 and 9, FIG. 8 illustrates a scheme for providing a hybrid SHVC handoff service in MMT-based hybrid broadcasting according to an example, and FIG. 9 illustrates the SLT of FIG. 8 according to an example.

FIG. 14 illustrates service-layer signaling information according to an example.

In FIG. 14, service-layer signaling information corresponding to the service signaling of FIG. 8 is depicted.

The service-layer signaling information may include USBD/USD, an MP table, and an MPD.

Figure 16:
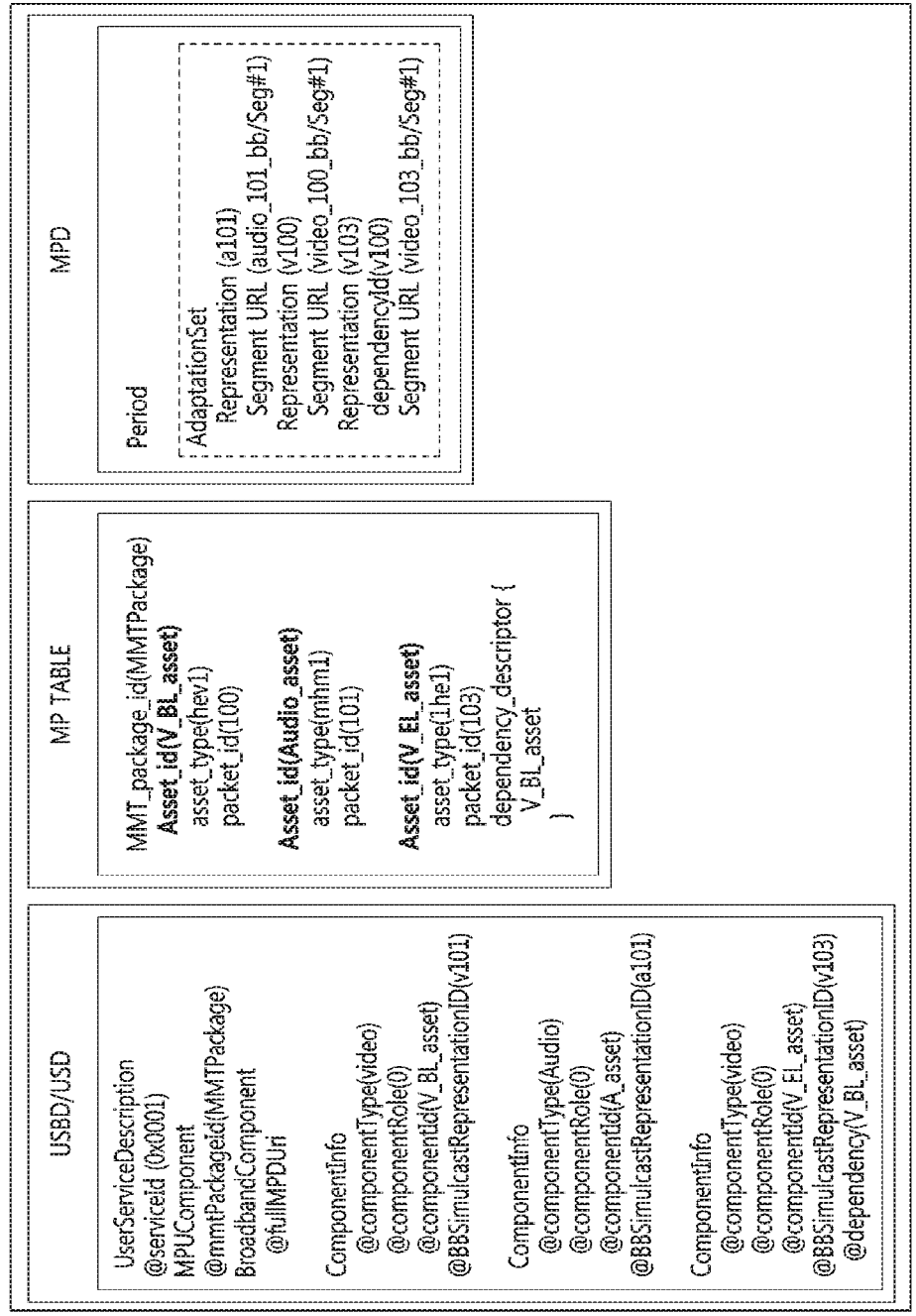
FIG. 16 illustrates service-layer signaling according to an example.

FIG. 16 illustrates service-layer signaling according to an example.

In FIG. 16, service-layer signaling information corresponding to the service signaling of FIG. 8 is depicted.

The service-layer signaling information may include USBD/USD, an MP table, and an MPD.

The USBD/USD may define overall ATSC 3.0 services.

The MP table may describe MMT service delivery over broadcast.

The MPD may be a DASH MPD for delivery over broadband.

As illustrated in FIG. 16, when dependency information between components is described in the USBD, the relationship between the components at an upper level may be extracted and recognized even if dependency information in the MP table and dependency information in MPD representation are not present.

The following Table 18 shows additional attributes related to ComponentInfo of USBD depending on the signaling details for the above-described MMT and DASH.

TABLE 18

| Level | Element or attribute name | Use | Data type |
|---|---|---|---|
| 1 | BundleDescriptionMMT | | |
| 2 | UserServiceDescription | 1 | |
| 3 | ... | | |
| 3 | MPUComponent | 0..1 | |
| 4 | ... | 1 | string |
| 4 | ComponentInfo | 0..N | |
| 5 | @componentType | 1 | unsignedByte |
| 5 | @ComponentRole | 1 | unsignedByte |
| 5 | @componentProtectedFlag | 0..1 | Boolean |
| 5 | @componentId | 1 | string |
| 5 | @componentName | 0..1 | string |
| 5 | @BBSimulcastRepresentationId (broadband simulcast representation identifier) | 0..1 | string |
| 5 | @componentDependency | 0..1 | string |
| 3 | ... | | |

@BBSimulcastRepresentationId may be the value of the ID attribute of a specified DASH representation corresponding to the current MPU component.

@BBSimulcastRepresentationId may indicate that the same content (e.g. layer) as that of an MPM component may be used in a specified service that is provided via broadband transmission. Here, the specified service may be a handoff service. The specified DASH representation may indicate information for receiving a DASH segment corresponding to the current MPU component, and the terminal 240 may acquire information for receiving the DASH segment corresponding to the current MPU component using the DASH representation having the ID indicated by @BBSimulcastRepresentationId, and may receive the DASH segment.

When there is a dependency relationship between the current MPU component and an additional MPU component, @componentDependency may represent @componentId of a target component having a dependency relationship with the current MPU component.

When the mutual relationship between an MMT asset and the DASH representation is definitely mapped by means of @BBSimulcastRepresentationId, information of @componentDependency may be equally applied to the MMT asset and the DASH representation, which are two specified streams.

Extension of Method for Describing Dependency on MMT and DASH

The following Table 19 shows the syntax of a dependency descriptor for layered media.

TABLE 19

| Syntax | value | Number of bits | Mnemonic |
|---|---|---|---|
| Dependency_descriptor() { | | | |
|   descriptor_tag | | 16 | uimsbf |
|   descriptor_length | | 16 | uimsbf |
|   num_dependencies | N1 | 8 | |
|   for (i = 0; i < N1 ; i++) { | | | |
|     asset_id() | | | |
|   } | | | |
| } | | | |

FIG. 17 illustrates modified syntax of a dependency descriptor for layered media according to an example.

An existing MMT standard may be defined so that only asset_id is described for Dependency_descriptor. In the modified syntax illustrated in FIG. 17, Representationid (i.e. the ID of representation) may also be described for Dependency_descriptor.

According to the existing DASH standard, @dependencyID may specify all complementary representations that a representation depends on in the decoding and/or presentation process. Such specification may be a whitespace-separated list of the values of @id attributes. That is, @dependencyID may be a whitespace-separated list of the values of @id attributes of all complementary representations.

According to the existing DASH standard, if there is no @dependencyID, representation may be decoded and presented independently of arbitrary additional representations. Also, @dependencyID must be able to be removed when no dependency on representations is present.

When the syntax modified with reference to FIG. 17 is used, an Asset_ID (i.e. an asset ID), as well as representation, may also be described for @dependencyID conforming to a DASH standard.

Fourth Alternative for Definition of Elements and Attributes

The definition of the above-described elements and attributes may be changed as shown in the following Table 20.

TABLE 20

| Level | Element or attribute name | Use | Data type | Description |
|---|---|---|---|---|
| 1 | BundleDescriptionMMT | | | A root element of User Service Bundle Description for MMTP |
| 2 | UserServiceDescription | 1 | | A single instance of an ATSC 3.0 service |
| 3 | ... | | | |
| 3 | ComponentInfo | 0..N | | This contains information about components available in the service. Each component includes information about the component type, component role, component name, component identifier, and component protection flag |

TABLE 20-continued

| Level | Element or attribute name | Use | Data type | Description |
|---|---|---|---|---|
| 4 | @componentType | 1 | unsignedByte | This attribute indicates the type of the corresponding component. |
| 4 | @ComponentRole | 1 | unsignedByte | This attribute indicates the role or kind of the corresponding component. |
| 4 | @componentProtectedFlag | 0..1 | Boolean | This attribute indicates whether the corresponding component is protected. |
| 4 | @componentId | 1 | String | This attribute indicates the identifier of the corresponding component. |
| 4 | @componentName | 0..1 | String | This attribute indicates the human-readable name of the corresponding component |
|  | @BBSimulcastRepId (@broadband simulcast representation ID) | 0..1 |  | This attribute indicates the DASH Representation delivered over broadband carrying the same content as the corresponding component |
|  | @DependencyRepId (@dependency representation ID) | 0..1 |  | This attribute indicates a dependency between the corresponding component and the DASH representation delivered over broadband. |

The following Table 21 presents more detailed descriptions of elements and attributes presented in Table 20.

TABLE 21

| Element or attribute name | description |
|---|---|
| ComponentInfo | This contains information about components available in the service. Each component includes information about the component type, component role, component name, component identifier, and component protection flag. When MPUComponent is present, ComponentInfo should be present. |
| @componentType | This attribute indicates the type of the corresponding component. A value of 0 indicates an audio component. A value of 1 indicates a video component. A value of 2 indicates a closed-caption component. Values of 3 to 7 are ATSC reserved. |
| @ComponentRole | This attribute indicates the role or kind of the corresponding component. For audio (i.e. when the value of the componentType attribute is 0), the value of the ComponentRole attribute is defined as shown in the foregoing Table 7. For video (i.e. when the value of the componentType attribute is 1), the value of the ComponentRole attribute is defined as shown in the following Table 22. For a closed caption (i.e. when the value of the componentType attribute is 2), the value of the ComponentRole attribute is defined as shown in the foregoing Table 11. When the value of the @componentType attribute is a value between 3 and 7, the value of @ComponentRole should be 255. |
| @componentProtectedFlag | This attribute indicates whether the corresponding component is protected (e.g. encrypted). When this flag is set to a value of 1, the corresponding component is protected (e.g. encrypted). When this flag is set to a value of 0, the corresponding component is not protected (e.g. not encrypted). When not present, the value of the componentProtectedFlag attribute is inferred to be equal to 0. |
| @componentId | This attribute indicates the identifier of the corresponding component. The value of this attribute should be the same as the asset ID in the MP table corresponding to the component. |
| @componentName | This attribute indicates the human-readable name of the corresponding component. When @componentName is not present, there is no default value. |
| @BBSimulcastRepId | This attribute indicates the DASH representation delivered over broadband carrying the same content as the corresponding component. This attribute should correspond to the Representation ID of the DASH representation carrying the same content as the corresponding component over broadband. When @BBSimulcastRepId is not present, there is no default value. |
| @DependencyRepId | This attribute indicates a dependency between the corresponding component and the DASH representation delivered over broadband. The value of this attribute should be the DASH representation ID |

TABLE 21-continued

| Element or attribute name | description |
|---|---|
| | that has the dependency on the corresponding component. For example, when @ComponentRole for video is 1 (i.e. base layer video), this attribute indicates the DASH representation over broadband that carries the Enhancement Layer video. For example, when @ComponentRole for video is 2 (i.e. Enhancement Layer video), this attribute indicates the DASH representation over broadband that carries the Base Layer video. When @DependencyRepId is not present, there is no default value. |

TABLE 22

| Value of @ComponentRole | Role or kind of video component |
|---|---|
| 0 | Primary Video |
| 1 | Base layer video |
| 2 | Enhancement layer video |
| 3-254 | ATSC Reserved |
| 255 | Unknown |

Fifth Alternative for Definition of Elements and Attributes

The definition of the above-described elements and attributes may be changed as given in the following Table 23.

TABLE 23

| Level | Element or attribute name | Use | Data type | Description |
|---|---|---|---|---|
| 1 | BundleDescriptionMMT | | | A root element of the User Service Bundle Description for MMTP |
| 2 | UserServiceDescription | 1 | | A single instance of an ATSC 3.0 Service |
| 3 | . . . | | | |
| 3 | BroadbandComponent | 0..1 | | A description of the content components of ATSC 3.0 Service delivered over broadband |
| 4 | @fullMPDUri | 1 | anyURI | Reference to an MPD fragment which contains descriptions of content components of the ATSC 3.0 Service delivered over broadband. |
| 4 | BroadbandComponentInfo | 0..N | | |
| 5 | @repId (representation ID) | 1 | StringNoWhiteSpace | Representation ID of the DASH Representation delivered over broadband. |
| 5 | @complementaryAssetId (@complementary asset ID) | 0..N | StringVectorType | All complementary MMT Assets that the DASH Representation depends on in the decoding and/or presentation process as a whitespace-separated list of values of complementary asset ID. |
| 5 | @simulcastAssetId | 0..1 | String | Asset ID of an MPU component carrying the same content as the DASH Representation |
| 3 | ComponentInfo | 0..N | | This contains information about components available in the service. Each component includes information about the component type, component role, component name, component identifier, and component protection flag. |
| 4 | @componentType | 1 | unsignedByte | This attribute indicates the type of the corresponding component |

TABLE 23-continued

| Level | Element or attribute name | Use | Data type | Description |
|---|---|---|---|---|
| 4 | @ComponentRole | 1 | unsignedByte | This attribute indicates the role or kind of the corresponding component. |
| 4 | @componentProtectedFlag | 0..1 | Boolean | This attribute indicates whether the corresponding component is protected. |
| 4 | @componentId | 1 | String | This attribute indicates the identifier of the corresponding component. |
| 4 | @componentName | 0..1 | String | This attribute indicates the human-readable name of the corresponding component. |

The following Table 24 presents more detailed descriptions of the elements and attributes presented in Table 23.

TABLE 24

| Element or attribute name | Description |
|---|---|
| BroadbandComponentInfo | A description of the content components of ATSC 3.0 Service delivered over broadband. |
| @RepId | This attribute indicates the representation ID of DASH Representation delivered over broadband. |
| @ComplementaryAssetId | This attribute indicates all complementary MMT Assets that the DASH Representation depends on in the decoding and/or presentation process as a whitespace-separated list of the values of complementary asset ID. This attribute should be used when there is a dependency between the DASH representation delivered over broadband and the MMT Asset(s) over broadcast. For example, when @ComponentRole for video of ComponentInfo is 1 (i.e. Base Layer video in the MMT Asset), this attribute should mean that the @RepId indicates the Enhancement Layer video over broadband. For example, when @ComponentRole for video of ComponentInfo is 2 (i.e. Enhancement Layer video in the MMT Asset), this attribute should mean that the @RepId indicates the Base Layer video over broadband. When @ComplementaryAssetId is not present, there is no default value. |
| @SimulcastAssetId | This attribute indicates the Asset ID of an MPU component carrying the same content as the DASH Representation. When @SimulcastAssetId is not present, there is no default value. |
| ComponentInfo | This contains information about components available in the service. Each component includes information about the component type, component role, component name, component identifier, and component protection flag. When MPUComponent is present, ComponentInfo must be present. |
| @componentType | This attribute indicates the type of the corresponding component. A value of 0 indicates an audio component. A value of 1 indicates a video component. A value of 2 indicates a closed-caption component. Values of 3 to 7 are ATSC reserved. |
| @ComponentRole | This attribute indicates the role or kind of the corresponding component. For audio (i.e. when the value of the componentType attribute is 0), the value of the ComponentRole attribute is defined as shown in the foregoing Table 7. For video (i.e. when the value of the componentType attribute is 1), the value of the ComponentRole attribute is defined as shown in the foregoing Table 22. For a closed caption (i.e. when the value of the componentType attribute is 2), the value of the ComponentRole attribute is defined as shown in the foregoing Table 11. When the value of @componentType attribute is a value between 3 and 7, the value of @ComponentRole should be 255. |

Sixth Alternative for Definition of Elements and Attributes

FIG. 18 illustrates service-layer signaling according to an example.

In FIG. 18, service-layer signaling information corresponding to the service signaling of FIG. 8 is illustrated.

The service layer signaling information may include USBD/USD, an MP table, and an MPD.

The USBD may specify relationships between MMT assets (i.e. broadcast) and MPD representations (i.e. broadband).

The MP table may describe MMT components only over broadcast.

The MPD may be a DASH MPD for delivery over broadband.

As illustrated in FIG. 18, when information about association between components is described in the USBD, the relationship between components may be extracted and recognized at an upper level even if association information in the MP table and association information in the MPD representation are not present.

The following Table 25 shows a user service description for MMTP according to an example.

TABLE 25

| level | Element or attribute name | Use | Data type | Description |
|---|---|---|---|---|
| 1 | BundleDescriptionMMT | | | A root element of User Service Bundle Description for MMTP |
| 2 | UserServiceDescription | 1 | | A single instance of an ATSC 3.0 service |
| 3 | @serviceId | 1 | unsignedShort | Reference to corresponding service entry in LLS (SLT) |
| 3 | @serviceStatus | 0..1 | Boolean | This specifies the status of this service as active or inactive |
| 3 | Name | 0..N | string | Name of ATSC 3.0 service |
| 4 | @lang (@language) | 1 | lang | Language of ATSC 3.0 service name |
| 3 | ServiceLanguage | 0..N | lang | Available languages of the ATSC 3.0 service |
| 3 | ContentAdvisoryRating | 0..N | sa:CARatingType | This specifies the RRT-based contents advisory rating, as defined in the ATSC 3.0 Service Announcement specification A/332. |
| 3 | OtherRatings | 0..N | sa:OtherRatingType | This specifies the Non-RRT content advisory rating, as defined in the ATSC 3.0 Service Announcement specification. |
| 3 | Channel | 1 | | This contains information about the service. |
| 4 | @serviceGenre | 0..1 | unsignedByte | This attribute indicates primary genre of the service. |
| 4 | @serviceIcon | 1 | anyURI | This attribute indicates the Uniform Resource Locator (URL) for the icon used to represent this service. |
| 4 | ServiceDescription | 0..N | | This contains service description (possibly in multiple languages). |
| 5 | @serviceDescrText | 1 | string | This attribute indicates a description of the service |
| 5 | @serviceDescrLang (@service description language) | 0..1 | lang | This attribute indicates the language of serviceDescrText |
| 3 | MPUComponent | 0..1 | | A description of the content components of ATSC 3.0 Service delivered as MPUs. |
| 4 | @mmtPackageId (@MMT package identifier) | 1 | string | Reference to an MMT Package for content components of the ATSC 3.0 Service delivered as MPUs. |
| 4 | @contentIdSchemeIdUri | 0..1 | anyURI | This attribute indicates a URI to identify the scheme for Content ID associated with the current MMT Package |
| 4 | @contentIdValue | 0..1 | string | This attribute indicates the value of Content ID associated with the current MMT Package. |
| 4 | @nextMMTPackageId @mmtPackageId (@next MMT package identifier) | 0..1 | string | Reference to an MMT Package to be used after the one referenced by in time for content components of the ATSC 3.0 Service delivered as MPUs. |
| 4 | @nextContentIdSchemeIdUri (@next content identifier scheme identifier URI) | 0..1 | anyURI | This attribute indicates a URI to identify the scheme for Content ID associated with the next MMT Package. |
| 4 | @nextContentIdValue | 0..1 | string | This attribute indicates the value of Content ID associated with the next MMT Package. |
| 3 | ROUTEComponent | 0..1 | | A description of locally cached service content of the ATSC 3.0 Service delivered via ROUTE. |
| 4 | @sTSIDUri (sTSID URI) | 1 | anyURI | Reference to the S-TSID fragment which provides access-related parameters of the Transport sessions (i.e. LCT channel(s) of ROUTE session(s)) carrying contents of this ATSC 3.0 Service. |
| 4 | @apdUri (@apd URI) | 0..1 | anyURI | Reference to the APD fragment which contains file-repair-related information |

TABLE 25-continued

| level | Element or attribute name | Use | Data type | Description |
|---|---|---|---|---|
| 4 | @sTSIDDestinationIpAddress (@sTSID destination IP address) | 0..1 | IPv4address | A string containing the dotted-IPv4 destination address of the packets carrying S-TSID for this service. |
| 4 | @sTSIDDestinationUdpPort (@sTSID destination UDP port) | 1 | unsignedShort (port) | Port number of the packets carrying S-TSID for this service. |
| 4 | @sTS ID SourceIpAddress (@sTSID source IP address) | 1 | IPv4address | A string containing the dotted-IPv4 source address of the packets carrying S-TSID for this service. |
| 4 | @sTSIDMajorProtocolVersion (@sTSID major protocol version) | 0..1 | unsignedByte | Major version number of the protocol used to deliver the S-TSID for this service. |
| 4 | @sTSIDMinorProtocolVersion (@sTSID minor protocol version) | 0..1 | unsignedByte | Minor version number of the protocol used to deliver the S-TSID for this service |
| 3 | BroadbandComponent (broadband component) | 0..1 | | A description of the content components of ATSC 3.0 Service delivered over broadband. |
| 4 | @fullMPDUri (@full MPDURI) | 1 | anyURI | Reference to an MPD fragment which contains descriptions of content components of the ATSC 3.0 Service delivered over broadband. |
| | BroadbandComponentInfo (broadband component information) | | | A description of the relationship among content components of ATSC 3.0 Service delivered over broadcast and broadband, respectively. |
| | @repId (representation ID) | | | Representation ID of the DASH Representation delivered over broadband. |
| | @complementaryAssetId (@complementary Asset ID) | | | All complementary MMT Assets that the DASH Representation depends on in the decoding and/or presentation process as a whitespace-separated list of values of complementary asset ID. |
| | @dependentAssetId (@dependent Asset ID) | | | All dependent MMT Assets that depend on the DASH Representation in the decoding and/or presentation process as a whitespace-separated list of values of dependent asset ID. |
| | @simulcastAssetId (@simulcast Asset ID) | 0..1 | String | Asset ID of an MPU component carrying the same content as the DASH Representation. |
| 3 | ComponentInfo (component information) | 0..N | | This contains information about components available in the service. Each component includes information about the component type, component role, component name, component identifier, and component protection flag. |
| 4 | @componentType | 1 | unsignedByte | This attribute indicates the type of the corresponding component |
| 4 | @ComponentRole | 1 | unsignedByte | This attribute indicates the role or kind of the corresponding component |
| 4 | @componentProtectedFlag | 0..1 | Boolean | This attribute indicates whether the corresponding component is protected. |
| 4 | @componentId | 1 | string | This attribute indicates the identifier of the corresponding component. |
| 4 | @componentName | 0..1 | string | This attribute indicates the human-readable name of the corresponding component. |

The BroadbandComponentInfo element may be a ascription or the relationship between the content components of ATSC 3.0 service respectively delivered over broadcast and broadband networks. The BroadbandComponentInfo element must be able to be present 1) when a dependency is present between a DASH representation delivered over broadband and an MMT asset delivered over broadcast, or 2) when the DASH representation delivered over broadband carries the same contents as the MMT asset on the broadcast.

The @repId attribute may indicate the representation identifier (ID) of the DASH representation that is delivered over broadband.

The @complementaryAssetId attribute indicates a whitespace-separated list of the values of complementary asset ID, and may indicate all complementary MMT assets that the DASH representation depends on in the decoding and/or presentation process. The @complementaryAssetId attribute may be used when the DASH representation delivered over broadband depends on MMT asset(s) on broadcast. When the @complementaryAssetId attribute is not present, there may be no default value. The dependent assets may depend on complementary assets. For example, a complementary asset may be a base layer, and a dependent asset may be a related enhancement layer.

The @dependentAssetId attribute may indicate a whitespace-separated list of the values of dependent asset ID, and may indicate all dependent MMT assets that depend on the DASH representation in the decoding and/or presentation process. The @dependentAssetId attribute may be used when MMT asset(s) delivered over broadcast depend on the DASH representation over broadband. When the @dependentAssetId attribute is not present, there may be no default value. In the definition of a dependent asset, ISO/IEC 23008-1 may be referred to.

For example, a complementary asset may be a base layer, and a dependent asset may be a related enhancement layer.

For example, when multiple layers may be replaced with each other, content of a layer in which a complementary asset appears and content of a layer in which a dependent asset appears may be identical to each other. Here, the layer in which the complementary asset appears and the layer in which the dependent asset appears may each be a base layer or an enhancement layer.

The @simulcastAssetId attribute may indicate the asset ID of a Media Processing Unit (MPU) component carrying the same contents as the DASH representation. When the @complementaryAssetId attribute is not present, there may be no default value.

The ComponentInfo element may contain information about components available in the service delivered as MPUs. For each component, ComponentInfo may include information about a component type, a component role, a component name, a component identifier, and a component protection flag. ComponentInfo may be present only when MPUComponent is present.

MMTP/MPU Modes for Accessing Hybrid Service

For both a transmission system and a reception system, hybrid streaming may be performed through broadcast and broadband delivery architecture. All system components may be locked to Coordinated Universal Time (UTC) for synchronization.

In the broadcast network, media data may be encapsulated into MPUs. Such MPUs may be packetized into MMTP packets.

In the communication network, media data may be encapsulated into DASH segments. The DASH segments may be delivered through a network interface based on regular HTTP servers in HTTP sessions. Meanwhile, the MPD of DASH may be transmitted over the broadcast network.

A URI reference for a DASH MPD must be able to be provided by a BroadbandComponent element in the MMTP-specific USBD.

When a dependency between an MPU delivered over the broadcast network and a DASH segment delivered over the broadband network is present, the MMTP-specific USB may include a child element BroadbandComponentInfo under the BroadbandComponent element.

Handoff from Broadcast to Broadband Service Access

The above-described handoff operational scenario may include the operation of allowing an ATSC 3.0 receiver to temporarily cease to receive broadcast coverage due to user mobility or change in reception conditions. Also, owing to this cessation, it may be possible to replace service reception over broadband.

Moreover, when a handoff from the broadcast to the broadband service access occurs or when a handoff from the broadband to the broadcast service access occurs, the components delivered over broadcast and unicast may be replaced with each other.

In order to support such a component-level handoff, BroadbandComponentInfo elements may further include @simulcastAssetId attribute. The @simulcastAssetId attribute may indicate the asset ID of an MPU component carrying the same content as a DASH representation. Further, the DASH representation may be delivered over broadband, and may be identified through @repID attribute under the BroadbandComponentInfo element.

There are provided a method and apparatus for providing a broadcast service based on a scalable codec in a hybrid broadcast environment in which a broadcast network and a communication network are used.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. A method for providing a broadcast service, comprising:
   generating first information about contents; and
   outputting the first information over a first network,
   wherein the first information comprises a first layer, among multiple layers of the contents,
   wherein the first information further comprises service information,
   wherein the service information is information used by a terminal to acquire second information about the contents over a second network,
   wherein the second information comprises a second layer, among the multiple layers,
   wherein the first network is a broadcast network,
   wherein the second network is a communication network,
   wherein the first information comprises all of the multiple layers of the contents, and
   wherein the second information comprises a part of the multiple layers.

2. The method of claim 1, wherein the multiple layers comprise a base layer and an enhancement layer for a scalable codec.

3. The method of claim 1, wherein:
   the first information comprises a base layer and an enhancement layer of the contents, and
   the second information comprises the enhancement layer.

4. The method of claim 1, wherein the service information comprises a description of a relationship between components of the contents respectively delivered over the first network and the second network.

5. The method of claim 1, wherein the service information comprises information describing the contents in a protocol used to transmit the second information over the second network.

6. The method of claim 1, wherein the service information comprises information describing a dependency between a layer of the first information and a layer of the second information.

7. The method of claim 1, wherein the service information comprises an identifier of a layer of the second information corresponding to a layer of the first information.

8. The method of claim 1, wherein the service information comprises an identifier of a layer of the second information that depends on a layer of the first information.

9. A broadcast server, comprising:
   a processing unit for generating first information about contents; and
   a communication unit for outputting the first information over a first network,
   wherein the first information comprises a first layer, among multiple layers of the contents,
   wherein the first information further comprises service information,
   wherein the service information is information used by a terminal to acquire second information about the contents over a second network,
   wherein the second information comprises a second layer, among the multiple layers,
   wherein the first network is a broadcast network,
   wherein the second network is a communication network,
   wherein the first information comprises all of the multiple layers of the contents, and
   wherein the second information comprises a part of the multiple layers.

10. A method for receiving a broadcast service, the method being performed by a terminal, comprising:
    receiving first information about contents over a first network; and
    receiving second information about the contents over a second network using service information,
    wherein the first information comprises a first layer, among multiple layers of the contents,
    wherein the first information further comprises the service information,
    wherein the service information is information used to acquire the second information about the contents over the second network,
    wherein the second information comprises a second layer, among the multiple layers,
    wherein the first network is a broadcast network,
    wherein the second network is a communication network, and
    wherein the broadcast network provides all of the multiple layers of the contents.

11. The method of claim 10, further comprising outputting the contents using the first information and the second information.

12. The method of claim 10, wherein the second information is received for a handoff of the terminal.

13. The method of claim 10, wherein the multiple layers comprise a base layer and an enhancement layer for a scalable codec.

14. The method of claim 10, wherein the service information comprises a description of a relationship between components of the contents respectively delivered over the first network and the second network.

15. The method of claim 10, wherein the service information comprises information describing the contents in a protocol used to transmit the second information over the second network.

16. The method of claim 10, wherein the service information comprises information describing a dependency between a layer of the first information and a layer of the second information.

17. The method of claim 10, wherein the service information comprises an identifier of a layer of the second information corresponding to a layer of the first information.

* * * * *